United States Patent
DeLine et al.

(10) Patent No.: US 7,667,579 B2
(45) Date of Patent: Feb. 23, 2010

(54) INTERIOR MIRROR SYSTEM

(75) Inventors: Jonathan E. DeLine, Raleigh, NC (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/339,775

(22) Filed: Dec. 19, 2008

(65) Prior Publication Data

US 2009/0128310 A1 May 21, 2009

Related U.S. Application Data

(63) Continuation of application No. 11/369,380, filed on Mar. 7, 2006, now Pat. No. 7,468,651, which is a continuation of application No. 10/913,186, filed on Aug. 6, 2004, now Pat. No. 7,012,543, which is a continuation of application No. 10/298,194, filed on Nov. 15, 2002, now Pat. No. 6,774,810, which is a continuation of application No. 09/993,813, filed on Nov. 14, 2001, now Pat. No. 6,483,438, which is a continuation of application No. 09/734,440, filed on Dec. 11, 2000, now Pat. No. 6,366,213, which is a continuation of application No. 09/244,726, filed on Feb. 5, 1999, now Pat. No. 6,172,613, which is a continuation-in-part of application No. 09/025,712, filed on Feb. 18, 1998, now Pat. No. 6,087,953.

(51) Int. Cl.
*B60Q 1/00* (2006.01)
*G08B 5/00* (2006.01)
(52) U.S. Cl. .............................. 340/425.5; 340/815.45; 340/438; 362/494; 359/838
(58) Field of Classification Search ............... 340/425.5
See application file for complete search history.

(56) References Cited

U.S. PATENT DOCUMENTS 2,166,303 A 7/1939 Hodny et al.

(Continued)

FOREIGN PATENT DOCUMENTS

DE 941408 4/1956

(Continued)

OTHER PUBLICATIONS

Steward, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.
Edgar, Julian; Goodbye 12 Volts . . . Hello 42 Volts!; Oct. 5, 1999; Autospeed 50; Issue 50; www.autospeed.co.nz/cms/A_0319/article.html.
Kobe, Gerry; 42 Volts Goes Underhood; Mar. 2000; Automotive Industries; Cahners Publishing Company; www.findarticles.com/p/articles/mi_m3012/is_3_180/ai_61361677.

(Continued)

*Primary Examiner*—Donnie L Crosland
(74) *Attorney, Agent, or Firm*—Van Dyke, Gardner, Linn & Burkhart LLP

(57) ABSTRACT

An interior mirror system suitable for use in a vehicle comprises an interior rearview mirror assembly with an information display disposed within the housing and behind the reflective element and viewable through the reflective element by a driver of the equipped vehicle viewing the reflective element when the interior rearview mirror assembly is normally mounted to an interior portion of the equipped vehicle. A control is responsive to a photo sensor and operable to distinguish between daytime and nighttime lighting conditions. The control is operable to vary the intensity of the information displayed by the information display as viewed through the reflective element by the driver of the equipped vehicle. When the information display is operating during daytime lighting conditions, the control may adjust the intensity of the displayed information to at least about 1000 cd/m$^2$ as viewed through the reflective element by the driver of the equipped vehicle.

20 Claims, 13 Drawing Sheets

U.S. PATENT DOCUMENTS

| | | |
|---|---|---|
| 3,185,020 A | 5/1965 | Thelen ............... 88/1 |
| 3,432,225 A | 3/1969 | Rock ............... 350/164 |
| 3,543,018 A | 11/1970 | Barcus et al. |
| 3,557,265 A | 1/1971 | Chisholm et al. |
| 3,565,985 A | 2/1971 | Schrenk et al. |
| 3,628,851 A | 12/1971 | Robertson |
| 3,676,668 A | 7/1972 | Collins et al. |
| 3,711,176 A | 1/1973 | Alfrey, Jr. et al. |
| 3,781,090 A | 12/1973 | Sumita ............... 350/164 |
| 3,821,590 A | 6/1974 | Kosman et al. |
| 3,860,847 A | 1/1975 | Carley |
| 4,006,546 A | 2/1977 | Anderson et al. ............. 40/132 |
| 4,035,681 A | 7/1977 | Savage |
| 4,075,468 A | 2/1978 | Marcus |
| 4,109,235 A | 8/1978 | Bouthors |
| 4,171,875 A | 10/1979 | Taylor et al. ............... 350/289 |
| 4,211,955 A | 7/1980 | Ray |
| 4,214,266 A | 7/1980 | Myers |
| 4,228,490 A | 10/1980 | Thillays |
| 4,257,703 A | 3/1981 | Goodrich |
| 4,277,804 A | 7/1981 | Robison |
| 4,281,899 A | 8/1981 | Oskam |
| 4,306,768 A | 12/1981 | Egging |
| 4,310,851 A | 1/1982 | Pierrat |
| 4,331,382 A | 5/1982 | Graff |
| 4,377,613 A | 3/1983 | Gordon |
| 4,419,386 A | 12/1983 | Gordon |
| 4,425,717 A | 1/1984 | Marcus ............... 33/361 |
| 4,435,042 A | 3/1984 | Wood et al. ............... 350/281 |
| 4,436,371 A | 3/1984 | Wood et al. ............... 350/281 |
| 4,446,171 A | 5/1984 | Thomas ............... 427/160 |
| 4,490,227 A | 12/1984 | Bitter |
| 4,499,451 A | 2/1985 | Suzuki et al. |
| 4,524,941 A | 6/1985 | Wood et al. ............... 248/544 |
| 4,546,551 A | 10/1985 | Franks |
| 4,580,196 A | 4/1986 | Task |
| 4,581,827 A | 4/1986 | Higashi ............... 33/333 |
| 4,588,267 A | 5/1986 | Pastore ............... 350/600 |
| 4,630,904 A | 12/1986 | Pastore ............... 350/600 |
| 4,638,287 A | 1/1987 | Umebayashi et al. |
| 4,646,210 A | 2/1987 | Skogler et al. ............... 362/142 |
| 4,665,430 A | 5/1987 | Hiroyasu |
| 4,692,798 A | 9/1987 | Seko et al. |
| 4,694,295 A | 9/1987 | Miller et al. ............... 340/903 |
| 4,712,879 A | 12/1987 | Lynam et al. ............... 350/357 |
| 4,729,076 A | 3/1988 | Masami et al. |
| 4,733,335 A | 3/1988 | Serizawa et al. |
| 4,733,336 A | 3/1988 | Skogler et al. ............... 362/142 |
| 4,740,838 A | 4/1988 | Mase et al. |
| 4,761,061 A | 8/1988 | Nishiyama et al. |
| 4,780,752 A | 10/1988 | Angerstein et al. |
| 4,781,436 A | 11/1988 | Armbruster ............... 350/281 |
| 4,793,690 A | 12/1988 | Gahan et al. ............... 350/279 |
| 4,793,695 A | 12/1988 | Wada et al. |
| 4,799,768 A | 1/1989 | Gahan ............... 350/279 |
| 4,807,096 A | 2/1989 | Skogler et al. ............... 362/142 |
| 4,855,161 A | 8/1989 | Moser et al. |
| 4,862,594 A | 9/1989 | Schierbeek et al. ............ 33/356 |
| 4,882,565 A | 11/1989 | Gallmeyer |
| 4,883,349 A | 11/1989 | Mittelhäuser |
| 4,886,960 A | 12/1989 | Molyneux et al. ............ 250/209 |
| 4,910,591 A | 3/1990 | Petrossian et al. |
| 4,926,170 A | 5/1990 | Beggs et al. ............... 340/904 |
| 4,930,742 A | 6/1990 | Schofield et al. ............ 248/465.1 |
| 4,935,665 A | 6/1990 | Murata |
| 4,936,533 A | 6/1990 | Adams et al. ............. 248/222.1 |
| 4,937,945 A | 7/1990 | Schofield et al. ............... 33/356 |
| 4,943,796 A | 7/1990 | Lee ............... 340/903 |
| 4,948,242 A | 8/1990 | Desmond et al. ............. 350/637 |
| 4,953,305 A | 9/1990 | Van Lente et al. ............. 33/356 |
| 4,959,247 A | 9/1990 | Moser et al. |
| 4,959,865 A | 9/1990 | Stettiner et al. ............... 381/46 |
| 4,973,844 A | 11/1990 | O'Farrell et al. ............. 250/341 |
| 4,996,083 A | 2/1991 | Moser et al. |
| 5,005,213 A | 4/1991 | Hanson et al. |
| 5,006,971 A | 4/1991 | Jenkins |
| 5,014,167 A | 5/1991 | Roberts ............... 362/83.1 |
| 5,016,996 A | 5/1991 | Ueno |
| 5,027,200 A | 6/1991 | Petrossian et al. |
| 5,038,255 A | 8/1991 | Nishihashi et al. |
| 5,058,851 A | 10/1991 | Lawlor et al. ............... 248/549 |
| 5,066,112 A | 11/1991 | Lynam et al. ............... 359/267 |
| 5,073,012 A | 12/1991 | Lynam ............... 359/265 |
| 5,076,673 A | 12/1991 | Lynam et al. ............... 359/271 |
| 5,076,674 A | 12/1991 | Lynam ............... 359/274 |
| 5,100,095 A | 3/1992 | Haan et al. ............... 248/549 |
| 5,117,346 A | 5/1992 | Gard ............... 363/51 |
| 5,121,200 A | 6/1992 | Choi et al. |
| 5,136,483 A | 8/1992 | Schöniger et al. ............. 362/61 |
| 5,140,455 A | 8/1992 | Varaprasad et al. ......... 359/275 |
| 5,142,407 A | 8/1992 | Varaprasad et al. ......... 359/276 |
| 5,151,816 A | 9/1992 | Varaprasad et al. ......... 359/275 |
| 5,151,824 A | 9/1992 | O'Farrell |
| 5,160,200 A | 11/1992 | Cheselske |
| 5,160,201 A | 11/1992 | Wrobel |
| 5,173,881 A | 12/1992 | Sindle ............... 367/101 |
| 5,178,448 A | 1/1993 | Adams et al. ............... 362/83.1 |
| 5,179,471 A | 1/1993 | Caskey et al. |
| 5,189,537 A | 2/1993 | O'Farrell |
| 5,193,029 A | 3/1993 | Schofield et al. ............. 359/604 |
| 5,197,562 A | 3/1993 | Kakinami et al. |
| 5,207,492 A | 5/1993 | Roberts ............... 362/30 |
| 5,223,814 A | 6/1993 | Suman ............... 340/525 |
| 5,229,975 A | 7/1993 | Truesdell et al. ............. 367/107 |
| 5,230,400 A | 7/1993 | Kakinami et al. |
| 5,233,461 A | 8/1993 | Dornan et al. |
| 5,235,316 A | 8/1993 | Qualizza ............... 340/436 |
| 5,239,405 A | 8/1993 | Varaprasad et al. |
| 5,243,417 A | 9/1993 | Pollard |
| 5,252,354 A | 10/1993 | Cronin et al. |
| 5,253,109 A | 10/1993 | O'Farrell et al. ............. 340/461 |
| 5,255,442 A | 10/1993 | Schierbeek et al. ............ 33/361 |
| 5,277,986 A | 1/1994 | Cronin et al. |
| 5,280,555 A | 1/1994 | Ainsburg ............... 385/116 |
| 5,285,060 A | 2/1994 | Larson et al. ............... 250/214 |
| 5,289,321 A | 2/1994 | Secor |
| 5,296,924 A | 3/1994 | Blancard et al. |
| 5,303,205 A | 4/1994 | Gauthier et al. |
| 5,304,980 A | 4/1994 | Maekawa |
| 5,313,335 A | 5/1994 | Gray et al. ............... 359/839 |
| 5,330,149 A | 7/1994 | Haan et al. ............... 248/549 |
| 5,339,075 A | 8/1994 | Abst et al. ............... 340/903 |
| 5,339,529 A | 8/1994 | Lindberg ............... 33/355 |
| 5,355,284 A | 10/1994 | Roberts |
| 5,361,190 A | 11/1994 | Roberts et al. |
| 5,371,659 A | 12/1994 | Pastrick et al. |
| 5,373,482 A | 12/1994 | Gauthier ............... 367/99 |
| 5,386,285 A | 1/1995 | Asayama |
| 5,406,414 A | 4/1995 | O'Farrell et al. ............. 359/604 |
| 5,408,357 A | 4/1995 | Buekema |
| 5,414,461 A | 5/1995 | Kishi et al. |
| 5,416,313 A | 5/1995 | Larson et al. ............... 250/214 |
| 5,416,478 A | 5/1995 | Morinaga |
| 5,418,610 A | 5/1995 | Fischer |
| 5,424,726 A | 6/1995 | Beymer ............... 180/167 |
| 5,424,865 A | 6/1995 | Lynam |
| 5,424,952 A | 6/1995 | Asayama ............... 364/443 |
| 5,432,496 A | 7/1995 | Lin |
| 5,444,478 A | 8/1995 | LeLong et al. |
| 5,446,576 A | 8/1995 | Lynam et al. ............... 359/267 |
| 5,455,716 A | 10/1995 | Suman et al. ............... 359/838 |
| 5,469,298 A | 11/1995 | Suman et al. |
| 5,475,366 A | 12/1995 | Van Lente et al. ............. 340/525 |
| 5,475,494 A | 12/1995 | Nishida et al. |

| Patent Number | Date | Inventor | Class |
|---|---|---|---|
| 5,481,409 A | 1/1996 | Roberts | |
| 5,483,453 A | 1/1996 | Uemura et al. | |
| 5,485,378 A | 1/1996 | Franke et al. | |
| 5,487,522 A | 1/1996 | Hook | 248/549 |
| 5,488,496 A | 1/1996 | Pine | |
| 5,497,305 A | 3/1996 | Pastrick et al. | 362/83.1 |
| 5,497,306 A | 3/1996 | Pastrick | 362/83.1 |
| 5,500,760 A | 3/1996 | Varaprasad et al. | |
| 5,515,448 A | 5/1996 | Nishitani | |
| 5,521,760 A | 5/1996 | DeYoung et al. | 359/601 |
| 5,523,811 A | 6/1996 | Wada et al. | |
| 5,525,264 A | 6/1996 | Cronin et al. | 252/583 |
| 5,528,474 A | 6/1996 | Roney et al. | |
| 5,530,240 A | 6/1996 | Larson et al. | 250/214 |
| 5,530,421 A | 6/1996 | Marshall et al. | |
| 5,535,056 A | 7/1996 | Caskey et al. | 359/603 |
| 5,535,144 A | 7/1996 | Kise | |
| 5,541,590 A | 7/1996 | Nishio | |
| 5,550,677 A | 8/1996 | Schofield et al. | 359/604 |
| 5,567,360 A | 10/1996 | Varaprasad et al. | 252/583 |
| 5,570,127 A | 10/1996 | Schmidt | |
| 5,572,354 A | 11/1996 | Desmond et al. | 359/265 |
| 5,574,443 A | 11/1996 | Hsieh | |
| 5,576,687 A | 11/1996 | Blank et al. | 340/438 |
| 5,576,975 A | 11/1996 | Sasaki et al. | |
| 5,587,236 A | 12/1996 | Agrawal et al. | 428/334 |
| 5,602,542 A | 2/1997 | Widmann et al. | |
| 5,610,756 A | 3/1997 | Lynam et al. | 359/267 |
| 5,611,966 A | 3/1997 | Varaprasad et al. | |
| 5,615,023 A | 3/1997 | Yang | |
| 5,615,857 A | 4/1997 | Hook | 248/549 |
| 5,617,085 A | 4/1997 | Tsutsumi et al. | |
| 5,631,638 A | 5/1997 | Kaspar et al. | 340/902 |
| 5,631,639 A | 5/1997 | Hibino et al. | 180/169 |
| 5,632,092 A | 5/1997 | Blank et al. | |
| 5,632,551 A | 5/1997 | Roney et al. | |
| 5,634,709 A | 6/1997 | Iwama | 362/492 |
| 5,642,238 A | 6/1997 | Sala | |
| 5,644,851 A | 7/1997 | Blank et al. | |
| 5,646,614 A | 7/1997 | Abersfelder et al. | |
| 5,649,756 A | 7/1997 | Adams et al. | 362/83.1 |
| 5,649,758 A | 7/1997 | Dion | 362/103 |
| 5,650,765 A | 7/1997 | Park | |
| 5,661,455 A | 8/1997 | Van Lente et al. | 350/525 |
| 5,662,375 A | 9/1997 | Adams et al. | 296/214 |
| 5,668,663 A | 9/1997 | Varaprasad et al. | 359/608 |
| 5,668,675 A | 9/1997 | Fredricks | 362/83.1 |
| 5,669,698 A | 9/1997 | Veldman et al. | 362/83.1 |
| 5,669,699 A | 9/1997 | Pastrick et al. | |
| 5,669,704 A | 9/1997 | Pastrick | |
| 5,669,705 A | 9/1997 | Pastrick et al. | |
| 5,670,935 A | 9/1997 | Schofield et al. | 340/461 |
| 5,671,996 A | 9/1997 | Bos et al. | 362/83.1 |
| 5,673,994 A | 10/1997 | Fant, Jr. et al. | 362/831 |
| 5,680,123 A | 10/1997 | Lee | |
| 5,680,245 A | 10/1997 | Lynam | 359/265 |
| 5,691,848 A | 11/1997 | Van Lente et al. | 359/601 |
| 5,699,044 A | 12/1997 | Van Lente et al. | 350/525 |
| 5,708,410 A | 1/1998 | Blank et al. | 350/438 |
| 5,708,415 A | 1/1998 | Van Lente et al. | 340/525 |
| 5,708,857 A | 1/1998 | Ishibashi | |
| 5,715,093 A | 2/1998 | Schierbeek et al. | 359/601 |
| 5,724,187 A | 3/1998 | Varaprasad et al. | 359/608 |
| 5,724,316 A | 3/1998 | Brunts | |
| 5,729,194 A | 3/1998 | Spears et al. | |
| 5,737,226 A | 4/1998 | Olson et al. | 364/457 |
| 5,741,966 A | 4/1998 | Handfield et al. | 73/146.5 |
| 5,745,050 A | 4/1998 | Nakagawa | |
| 5,751,211 A | 5/1998 | Shirai et al. | |
| 5,751,489 A | 5/1998 | Caskey et al. | 359/603 |
| 5,754,099 A | 5/1998 | Nishimura et al. | |
| 5,760,828 A | 6/1998 | Cortes | |
| 5,760,962 A | 6/1998 | Schofield et al. | 359/604 |
| 5,761,094 A | 6/1998 | Olson et al. | |
| 5,764,139 A | 6/1998 | Nojima et al. | |
| 5,765,940 A | 6/1998 | Levy et al. | |
| 5,767,793 A | 6/1998 | Agravante et al. | |
| 5,775,762 A | 7/1998 | Vitito | |
| 5,786,772 A | 7/1998 | Schofield et al. | |
| 5,788,357 A | 8/1998 | Muth et al. | |
| 5,790,973 A | 8/1998 | Blaker et al. | |
| 5,793,308 A | 8/1998 | Rosinski et al. | |
| 5,793,420 A | 8/1998 | Schmidt | |
| 5,796,094 A | 8/1998 | Schofield et al. | 350/208.1 |
| 5,796,176 A | 8/1998 | Kramer et al. | 307/10.1 |
| 5,798,575 A | 8/1998 | O'Farrell et al. | 307/10.1 |
| 5,798,688 A | 8/1998 | Schofield | 340/438 |
| 5,802,727 A | 9/1998 | Blank et al. | 33/361 |
| 5,803,579 A | 9/1998 | Turnbull et al. | 362/83.1 |
| 5,805,367 A | 9/1998 | Kanazawa | |
| 5,806,965 A | 9/1998 | Deese | |
| 5,808,197 A | 9/1998 | Dao | 73/514.09 |
| 5,808,777 A | 9/1998 | Lynam et al. | 359/265 |
| 5,813,745 A | 9/1998 | Fant, Jr. et al. | 362/83.1 |
| 5,820,097 A | 10/1998 | Spooner | 248/549 |
| 5,820,245 A | 10/1998 | Desmond et al. | 362/83.1 |
| 5,823,654 A | 10/1998 | Pastrick et al. | |
| 5,844,505 A | 12/1998 | Van Ryzin | |
| 5,850,176 A | 12/1998 | Kinoshita et al. | |
| 5,863,116 A | 1/1999 | Pastrick et al. | |
| 5,871,275 A | 2/1999 | O'Farrell et al. | |
| 5,877,707 A | 3/1999 | Kowalick | |
| 5,877,897 A | 3/1999 | Schofield et al. | 359/604 |
| 5,878,370 A | 3/1999 | Olson | |
| 5,879,074 A | 3/1999 | Pastrick | |
| 5,883,739 A | 3/1999 | Ashihara et al. | |
| 5,899,956 A | 5/1999 | Chan | |
| 5,904,729 A | 5/1999 | Ruzicka | |
| 5,910,854 A | 6/1999 | Varaprasad et al. | 359/273 |
| 5,914,815 A | 6/1999 | Bos | 359/571 |
| 5,924,212 A | 7/1999 | Domanski | 33/355 |
| 5,929,786 A | 7/1999 | Schofield et al. | 340/903 |
| 5,938,321 A | 8/1999 | Bos et al. | 362/494 |
| 5,940,011 A | 8/1999 | Agravante et al. | |
| 5,940,120 A | 8/1999 | Frankhouse et al. | 348/61 |
| 5,949,331 A | 9/1999 | Schofield et al. | 340/461 |
| 5,956,079 A | 9/1999 | Ridgley | |
| 5,956,181 A | 9/1999 | Lin | 359/630 |
| 5,959,367 A | 9/1999 | O'Farrell et al. | 307/10.1 |
| 5,959,555 A | 9/1999 | Furuta | |
| 5,971,552 A | 10/1999 | O'Farrelll et al. | 359/871 |
| 5,975,715 A | 11/1999 | Bauder | |
| 6,000,823 A | 12/1999 | Desmond et al. | 362/494 |
| 6,001,486 A | 12/1999 | Varaprasad et al. | 428/428 |
| 6,002,511 A | 12/1999 | Varaprasad et al. | 359/265 |
| 6,002,544 A | 12/1999 | Yatsu | 360/78.09 |
| 6,007,222 A | 12/1999 | Thau | |
| 6,009,359 A | 12/1999 | El-Hakim et al. | |
| 6,016,035 A | 1/2000 | Eberspacher et al. | |
| 6,019,411 A | 2/2000 | Carter et al. | 296/37.7 |
| 6,019,475 A | 2/2000 | Lynam et al. | 359/879 |
| 6,023,229 A | 2/2000 | Bugno et al. | |
| 6,025,872 A | 2/2000 | Ozaki et al. | |
| 6,037,689 A | 3/2000 | Bingle et al. | |
| 6,042,253 A | 3/2000 | Fant, Jr. et al. | 362/494 |
| 6,045,243 A | 4/2000 | Muth et al. | |
| 6,046,766 A | 4/2000 | Sakata | |
| 6,046,837 A | 4/2000 | Yamamoto | |
| 6,060,989 A | 5/2000 | Gehlot | |
| 6,061,002 A | 5/2000 | Weber et al. | |
| 6,065,840 A | 5/2000 | Caskey et al. | 359/603 |
| 6,067,111 A | 5/2000 | Hahn et al. | |
| 6,072,391 A | 6/2000 | Suzuki et al. | |
| 6,074,777 A | 6/2000 | Reimers et al. | |
| 6,078,355 A | 6/2000 | Zengel | |
| 6,078,865 A | 6/2000 | Koyanagi | |

| | | | |
|---|---|---|---|
| 6,082,881 A | 7/2000 | Hicks | |
| 6,086,131 A | 7/2000 | Bingle et al. ............. 296/76 | |
| 6,086,229 A | 7/2000 | Pastrick | |
| 6,087,012 A | 7/2000 | Varaprasad et al. ....... 428/428 | |
| 6,087,953 A | 7/2000 | DeLine et al. .......... 340/815.4 | |
| 6,097,023 A | 8/2000 | Schofield et al. ......... 250/208.1 | |
| 6,099,131 A | 8/2000 | Fletcher et al. ............. 359/604 | |
| 6,099,155 A | 8/2000 | Pastrick et al. | |
| 6,102,559 A | 8/2000 | Nold et al. | |
| 6,104,552 A | 8/2000 | Thau et al. .................. 359/726 | |
| 6,106,121 A | 8/2000 | Buckley et al. | |
| 6,111,498 A | 8/2000 | Jobes et al. | |
| 6,115,651 A | 9/2000 | Cruz | |
| 6,116,743 A | 9/2000 | Hoek | |
| 6,122,597 A | 9/2000 | Saneyoshi et al. | |
| 6,124,647 A | 9/2000 | Marcus et al. ............. 307/10.1 | |
| 6,124,886 A | 9/2000 | DeLine et al. ............. 348/148 | |
| 6,128,576 A | 10/2000 | Nishimoto et al. | |
| 6,132,072 A | 10/2000 | Turnbull et al. | |
| 6,139,171 A | 10/2000 | Waldmann | |
| 6,139,172 A | 10/2000 | Bos et al. .................... 362/494 | |
| 6,140,933 A | 10/2000 | Bugno et al. | |
| 6,146,003 A | 11/2000 | Thau | |
| 6,149,287 A | 11/2000 | Pastrick et al. | |
| 6,150,014 A | 11/2000 | Chu et al. | |
| 6,151,065 A | 11/2000 | Steed et al. | |
| 6,151,539 A | 11/2000 | Bergholz et al. | |
| 6,152,590 A | 11/2000 | Furst et al. | |
| 6,154,149 A | 11/2000 | Tychkowski et al. | |
| 6,154,306 A | 11/2000 | Varaprasad et al. ......... 359/273 | |
| 6,157,294 A | 12/2000 | Urai et al. | |
| 6,158,655 A | 12/2000 | DeVries, Jr. et al. ........ 235/380 | |
| 6,166,625 A | 12/2000 | Teowee et al. .............. 340/426 | |
| 6,166,628 A | 12/2000 | Andreas | |
| 6,166,848 A | 12/2000 | Cammenga et al. | |
| 6,167,755 B1 | 1/2001 | Damson et al. | |
| 6,169,955 B1 | 1/2001 | Fultz | |
| 6,170,956 B1 | 1/2001 | Rumsey et al. ............. 359/839 | |
| 6,172,600 B1 | 1/2001 | Kakinami et al. | |
| 6,172,601 B1 | 1/2001 | Wada et al. | |
| 6,172,613 B1 | 1/2001 | DeLine et al. .......... 340/815.4 | |
| 6,173,501 B1 | 1/2001 | Blank et al. | |
| 6,175,164 B1 | 1/2001 | O'Farrell et al. ........... 307/10.1 | |
| 6,175,300 B1 | 1/2001 | Kendrick ................... 340/436 | |
| 6,176,602 B1 | 1/2001 | Pastrick et al. | |
| 6,178,034 B1 | 1/2001 | Allemand et al. ........... 359/265 | |
| 6,183,119 B1 | 2/2001 | Desmond et al. ............ 362/494 | |
| 6,184,781 B1 | 2/2001 | Ramakesavan | |
| 6,185,492 B1 | 2/2001 | Kagawa et al. | |
| 6,191,704 B1 | 2/2001 | Takenaga et al. | |
| 6,196,688 B1 | 3/2001 | Caskey et al. ............... 359/603 | |
| 6,198,409 B1 | 3/2001 | Schofield et al. ............ 340/903 | |
| 6,199,014 B1 | 3/2001 | Walker et al. | |
| 6,200,010 B1 | 3/2001 | Anders | |
| 6,201,642 B1 | 3/2001 | Bos ............................. 359/565 | |
| 6,210,008 B1 | 4/2001 | Hoekstra et al. ............. 359/603 | |
| 6,217,181 B1 | 4/2001 | Lynam et al. ............... 359/879 | |
| 6,218,934 B1 | 4/2001 | Regan | |
| 6,222,447 B1 | 4/2001 | Schofield et al. ............ 340/461 | |
| 6,222,460 B1 | 4/2001 | DeLine et al. ........... 340/815.4 | |
| 6,227,689 B1 | 5/2001 | Miller | |
| 6,243,003 B1 | 6/2001 | DeLine et al. ........... 340/425.5 | |
| 6,245,262 B1 | 6/2001 | Varaprasad et al. | |
| 6,249,214 B1 | 6/2001 | Kashiwazaki | |
| 6,250,148 B1 | 6/2001 | Lynam ..................... 73/170.17 | |
| 6,250,766 B1 | 6/2001 | Strumolo et al. | |
| 6,250,783 B1 | 6/2001 | Stidham et al. | |
| 6,257,746 B1 | 7/2001 | Todd et al. | |
| 6,259,412 B1 | 7/2001 | Duroux | |
| 6,259,475 B1 | 7/2001 | Ramachandran et al. | |
| 6,265,968 B1 | 7/2001 | Betzitza et al. | |
| 6,268,803 B1 | 7/2001 | Gunderson et al. | |
| 6,269,308 B1 | 7/2001 | Kodaka et al. | |
| 6,276,821 B1 | 8/2001 | Pastrick et al. | |
| 6,276,822 B1 | 8/2001 | Bedrosian et al. | |
| 6,278,377 B1 | 8/2001 | DeLine et al. ........... 340/815.4 | |
| 6,278,941 B1 | 8/2001 | Yokoyama | |
| 6,280,068 B1 | 8/2001 | Mertens et al. | |
| 6,280,069 B1 | 8/2001 | Pastrick et al. | |
| 6,281,804 B1 | 8/2001 | Haller et al. | |
| 6,286,965 B1 | 9/2001 | Caskey et al. ............... 359/603 | |
| 6,286,984 B1 | 9/2001 | Berg | |
| 6,289,332 B2 | 9/2001 | Menig et al. | |
| 6,291,906 B1 | 9/2001 | Marcus et al. ............. 307/10.1 | |
| 6,294,989 B1 | 9/2001 | Schofield et al. ............ 340/442 | |
| 6,296,379 B1 | 10/2001 | Pastrick | |
| 6,297,781 B1 | 10/2001 | Turnbull et al. | |
| 6,299,333 B1 | 10/2001 | Pastrick et al. | |
| 6,300,879 B1 | 10/2001 | Regan et al. | |
| 6,304,173 B2 | 10/2001 | Pala et al. | |
| 6,305,807 B1 | 10/2001 | Schierbeek ................. 359/603 | |
| 6,310,611 B1 | 10/2001 | Caldwell | |
| 6,310,738 B1 | 10/2001 | Chu ........................... 359/883 | |
| 6,313,454 B1 | 11/2001 | Bos et al. .................. 250/208.1 | |
| 6,317,057 B1 | 11/2001 | Lee | |
| 6,317,248 B1 | 11/2001 | Agrawal et al. | |
| 6,318,870 B1 | 11/2001 | Spooner et al. ............. 359/872 | |
| 6,320,176 B1 | 11/2001 | Schofield et al. ......... 250/208.1 | |
| 6,320,282 B1 | 11/2001 | Caldwell | |
| 6,320,612 B1 | 11/2001 | Young | |
| 6,324,295 B1 | 11/2001 | Valery et al. | |
| 6,326,613 B1 | 12/2001 | Heslin et al. ................ 250/239 | |
| 6,326,900 B2 | 12/2001 | DeLine et al. ........... 350/815.4 | |
| 6,329,925 B1 | 12/2001 | Skiver et al. ............. 340/815.4 | |
| 6,330,511 B2 | 12/2001 | Ogura et al. | |
| 6,331,066 B1 | 12/2001 | Desmond et al. ............ 362/494 | |
| 6,333,759 B1 | 12/2001 | Mazzilli ..................... 348/148 | |
| 6,335,680 B1 | 1/2002 | Matsuoka | |
| 6,336,737 B1 | 1/2002 | Thau | |
| 6,344,805 B1 | 2/2002 | Yasui et al. | |
| 6,348,858 B2 | 2/2002 | Weis et al. | |
| 6,353,392 B1 | 3/2002 | Schofield et al. ............ 340/602 | |
| 6,356,206 B1 | 3/2002 | Takenaga et al. | |
| 6,357,883 B1 | 3/2002 | Strumolo et al. | |
| 6,362,548 B1 | 3/2002 | Bingle et al. | |
| 6,363,326 B1 | 3/2002 | Scully | |
| 6,366,213 B2 | 4/2002 | DeLine et al. ........... 350/815.4 | |
| 6,370,329 B1 | 4/2002 | Teuchert ........................ 396/7 | |
| 6,371,636 B1 | 4/2002 | Wesson | |
| 6,386,742 B1 | 5/2002 | DeLine et al. | |
| 6,390,529 B1 | 5/2002 | Bingle et al. | |
| 6,390,635 B2 | 5/2002 | Whitehead et al. | |
| 6,396,397 B1 | 5/2002 | Bos et al. | |
| 6,408,247 B1 | 6/2002 | Ichikawa et al. | |
| 6,411,204 B1 | 6/2002 | Bloomfield et al. | |
| 6,412,959 B1 | 7/2002 | Tseng | |
| 6,412,973 B1 | 7/2002 | Bos et al. | |
| 6,415,230 B1 | 7/2002 | Maruko et al. | |
| 6,416,208 B2 | 7/2002 | Pastrick et al. | |
| 6,418,376 B1 | 7/2002 | Olson | |
| 6,419,300 B1 | 7/2002 | Pavao et al. | |
| 6,420,975 B1 | 7/2002 | DeLine et al. | |
| 6,421,081 B1 | 7/2002 | Markus | |
| 6,424,272 B1 | 7/2002 | Gutta et al. | |
| 6,424,273 B1 | 7/2002 | Gutta et al. | |
| 6,424,892 B1 | 7/2002 | Matsuoka | |
| 6,426,492 B1 | 7/2002 | Bos et al. | |
| 6,427,349 B1 | 8/2002 | Blank et al. | |
| 6,428,172 B1 | 8/2002 | Hutzel et al. ................. 359/838 | |
| 6,433,676 B2 | 8/2002 | DeLine et al. | |
| 6,433,680 B1 | 8/2002 | Ho | |
| 6,437,688 B1 | 8/2002 | Kobayashi | |
| 6,438,491 B1 | 8/2002 | Farmer | |
| 6,439,755 B1 | 8/2002 | Fant et al. | |
| 6,441,872 B1 | 8/2002 | Ho | |
| 6,445,287 B1 | 9/2002 | Schofield et al. | |

| Patent No. | Date | Name |
|---|---|---|
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,466,701 B1 | 10/2002 | Ejiri et al. |
| 6,472,977 B1 | 10/2002 | Pöchmüller |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,513,252 B1 | 2/2003 | Schierbeek et al. |
| 6,515,581 B1 | 2/2003 | Ho |
| 6,515,582 B1 | 2/2003 | Teowee |
| 6,515,597 B1 | 2/2003 | Wada et al. |
| 6,520,667 B1 | 2/2003 | Mousseau |
| 6,522,451 B1 | 2/2003 | Lynam |
| 6,522,969 B2 | 2/2003 | Kannonji |
| 6,539,306 B2 | 3/2003 | Turnbull |
| 6,542,085 B1 | 4/2003 | Yang |
| 6,542,182 B1 | 4/2003 | Chutorash |
| 6,545,598 B1 | 4/2003 | De Villeroche |
| 6,553,308 B1 | 4/2003 | Hutzel et al. |
| 6,568,839 B1 | 5/2003 | Pastrick et al. |
| 6,572,233 B1 | 6/2003 | Northman et al. |
| 6,575,643 B2 | 6/2003 | Takahashi |
| 6,580,373 B1 | 6/2003 | Ohashi |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,593,565 B2 | 7/2003 | Heslin et al. ................ 250/239 |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |
| 6,611,759 B2 | 8/2003 | Brosche |
| 6,614,387 B1 | 9/2003 | Deadman |
| 6,616,764 B2 | 9/2003 | Krämer |
| 6,618,672 B2 | 9/2003 | Sasaki et al. |
| 6,627,918 B2 | 9/2003 | Getz et al. |
| 6,630,888 B2 | 10/2003 | Lang et al. |
| 6,636,258 B2 | 10/2003 | Strumolo |
| 6,642,840 B2 | 11/2003 | Lang et al. |
| 6,642,851 B2 | 11/2003 | DeLine et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,672,744 B2 | 1/2004 | DeLine et al. |
| 6,674,370 B2 | 1/2004 | Rodewald et al. |
| 6,675,075 B1 | 1/2004 | Engelsburg et al. |
| 6,678,614 B2 | 1/2004 | McCarthy et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,268 B2 | 2/2004 | Schofield et al. |
| 6,690,413 B1 | 2/2004 | Moore |
| 6,693,517 B2 | 2/2004 | McCarthy et al. |
| 6,693,518 B2 | 2/2004 | Kumata |
| 6,693,519 B2 | 2/2004 | Keirstead |
| 6,693,524 B1 | 2/2004 | Payne |
| 6,709,136 B2 | 3/2004 | Pastrick et al. |
| 6,717,610 B1 | 4/2004 | Bos et al. |
| 6,717,712 B2 | 4/2004 | Lynam et al. |
| 6,726,337 B2 | 4/2004 | Whitehead et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjönell |
| 6,748,211 B1 | 6/2004 | Isaac et al. |
| 6,756,912 B2 | 6/2004 | Skiver et al. |
| 6,757,109 B2 | 6/2004 | Bos |
| 6,774,356 B2 | 8/2004 | Heslin et al. ................ 250/239 |
| 6,774,810 B2 | 8/2004 | DeLine et al. |
| 6,778,904 B2 | 8/2004 | Iwami et al. |
| 6,810,323 B1 | 10/2004 | Bullock et al. |
| 6,824,281 B2 | 11/2004 | Schofield et al. |
| 6,832,848 B2 | 12/2004 | Pastrick |
| 6,836,725 B2 | 12/2004 | Millington et al. |
| 6,847,487 B2 | 1/2005 | Burgner |
| 6,848,817 B2 | 2/2005 | Bos et al. |
| 6,882,287 B2 | 4/2005 | Schofield |
| 6,902,284 B2 | 6/2005 | Hutzel et al. |
| 6,912,396 B2 | 6/2005 | Sziraki et al. |
| 6,946,978 B2 | 9/2005 | Schofield |
| 7,004,592 B2 | 2/2006 | Varaprasad et al. |
| 7,004,593 B2 | 2/2006 | Weller et al. |
| 7,012,543 B2 | 3/2006 | DeLine et al. |
| 7,046,448 B2 | 5/2006 | Burgner |
| 7,167,796 B2 | 1/2007 | Taylor et al. |
| 7,175,291 B1 | 2/2007 | Li |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,310,177 B2 | 12/2007 | McCabe et al. |
| 7,328,103 B2 | 2/2008 | McCarthy et al. |
| 7,344,284 B2 | 3/2008 | Lynam et al. |
| 7,370,983 B2 | 5/2008 | DeWind et al. |
| 7,412,328 B2 | 8/2008 | Uhlmann et al. |
| 7,446,650 B2 | 11/2008 | Scholfield et al. |
| 7,468,651 B2 | 12/2008 | DeLine et al. |
| 7,471,438 B2 | 12/2008 | McCabe et al. |
| 7,490,007 B2 | 2/2009 | Taylor et al. |
| 7,494,231 B2 | 2/2009 | Varaprasad et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0003571 A1 | 1/2002 | Schofield et al. |
| 2002/0049535 A1 | 4/2002 | Rigo et al. |
| 2002/0072026 A1 | 6/2002 | Lynam et al. |
| 2002/0093826 A1 | 7/2002 | Bos et al. |
| 2002/0126497 A1 | 9/2002 | Pastrick |
| 2002/0154007 A1 | 10/2002 | Yang |
| 2002/0159270 A1 | 10/2002 | Lynam et al. |
| 2002/0172053 A1 | 11/2002 | Pastrick et al. |
| 2002/0191409 A1 | 12/2002 | DeLine et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0016542 A1 | 1/2003 | Pastrick et al. |
| 2003/0020603 A1 | 1/2003 | DeLine et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0069690 A1 | 4/2003 | Correia et al. |
| 2003/0076415 A1 | 4/2003 | Strumolo |
| 2003/0080877 A1 | 5/2003 | Takagi et al. |
| 2003/0085806 A1 | 5/2003 | Samman et al. |

| | | |
|---|---|---|
| 2003/0088361 A1 | 5/2003 | Sekiguchi |
| 2003/0090568 A1 | 5/2003 | Pico |
| 2003/0090569 A1 | 5/2003 | Poechmuller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0169522 A1 | 9/2003 | Schofield et al. |
| 2003/0179293 A1 | 9/2003 | Oizumi |
| 2003/0202096 A1 | 10/2003 | Kim |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0080431 A1 | 4/2004 | White |
| 2004/0085196 A1 | 5/2004 | Miller et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0128065 A1 | 7/2004 | Taylor et al. |
| 2004/0145457 A1 | 7/2004 | Schofield et al. |
| 2004/0202001 A1 | 10/2004 | Roberts et al. |
| 2004/0243303 A1 | 12/2004 | Padmanabhan |
| 2005/0024729 A1 | 2/2005 | Ockerse et al. |
| 2005/0078389 A1 | 4/2005 | Kulas et al. |
| 2005/0079326 A1 | 4/2005 | Varaprasad et al. |
| 2005/0083577 A1 | 4/2005 | Varaprasad et al. |
| 2006/0007550 A1 | 1/2006 | Tonar et al. |
| 2006/0028730 A1 | 2/2006 | Varaprasad et al. |
| 2006/0050018 A1 | 3/2006 | Hutzel et al. |
| 2006/0164230 A1 | 7/2006 | DeWind et al. |
| 2007/0118287 A1 | 5/2007 | Taylor et al. |
| 2007/0132567 A1 | 6/2007 | Schofield et al. |
| 2007/0162229 A1 | 7/2007 | McCarthy et al. |
| 2007/0171037 A1 | 7/2007 | Schofield et al. |
| 2007/0183066 A1 | 8/2007 | Varaprasad et al. |
| 2007/0184284 A1 | 8/2007 | Varaprasad et al. |
| 2008/0013153 A1 | 1/2008 | McCabe et al. |
| 2008/0068520 A1 | 3/2008 | Minikey, Jr. et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0183355 A1 | 7/2008 | Taylor et al. |
| 2008/0186724 A1 | 8/2008 | Lynam et al. |
| 2008/0201075 A1 | 8/2008 | Taylor et al. |
| 2008/0212189 A1 | 9/2008 | Baur et al. |
| 2008/0212215 A1 | 9/2008 | Schofield et al. |
| 2008/0225538 A1 | 9/2008 | Lynam et al. |
| 2008/0266389 A1 | 10/2008 | DeWind et al. |
| 2008/0291522 A1 | 11/2008 | Varaprasad et al. |
| 2009/0015736 A1 | 1/2009 | Weller et al. |

FOREIGN PATENT DOCUMENTS

| | | |
|---|---|---|
| DE | 944531 | 7/1956 |
| DE | 7323996 | 11/1973 |
| DE | 2631713 A1 | 2/1977 |
| DE | 3301945 | 7/1984 |
| DE | 3614882 | 11/1987 |
| DE | 4444443 A1 | 6/1996 |
| DE | 29703084 | 6/1997 |
| DE | 29902344 | 7/1999 |
| EP | 0165817 | 12/1985 |
| EP | 03810116 A1 | 8/1990 |
| EP | 0254435 | 5/1992 |
| EP | 667254 A1 | 8/1995 |
| EP | 788947 | 8/1997 |
| EP | 937601 A2 | 8/1999 |
| FR | 1021987 | 2/1953 |
| FR | 1461419 | 12/1966 |
| FR | 2 759 045 | 8/1998 |
| GB | 810010 | 3/1959 |
| GB | 1008411 | 10/1965 |
| GB | 1136134 | 12/1968 |
| GB | 1553376 | 9/1979 |
| GB | 1566451 | 4/1980 |
| GB | 2210836 A | 6/1989 |
| GB | 2222991 | 3/1990 |
| GB | 2351055 | 12/2000 |
| JP | 5730639 | 2/1982 |
| JP | 57208530 | 12/1982 |
| JP | 5830729 | 2/1983 |
| JP | 59-114139 | 7/1984 |
| JP | 63106730 | 5/1988 |
| JP | 63106731 | 5/1988 |
| JP | 64-14700 | 1/1989 |
| JP | 4-114587 | 4/1992 |
| JP | 5-213113 | 8/1993 |
| JP | 11078693 | 3/1999 |
| WO | WO 8202448 | 7/1982 |
| WO | WO 9419212 | 9/1994 |
| WO | WO 9427262 | 11/1994 |
| WO | WO 9813235 | 4/1998 |
| WO | WO 9830415 | 7/1998 |
| WO | WO 0018612 | 4/2000 |
| WO | WO 0055685 | 9/2000 |

OTHER PUBLICATIONS

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, article, 4 pages Prentice-Hall, Englewood Cliffs, New Jersey, believed to be published more than one year prior to the filing date of the present application.

G. Wang, D. Renshaw, P.B. Denyer and M. Lu, CMOS Video Cameras, article, 1991, 4 pages, University of Edinburgh, UK.

U.S. Appl. No. 08/720,237, filed Sep. 26, 1996, entitled Automotive Pyroelectric Intrusion Detection, abandoned.

European Search Report for European Patent Application No. 99650017.9 of Sep. 21, 2000.

Search Report for British Patent Application No. GB 9705467.0.

Product Brochure entitled "SideMinder," published in 1993 by Autosense.

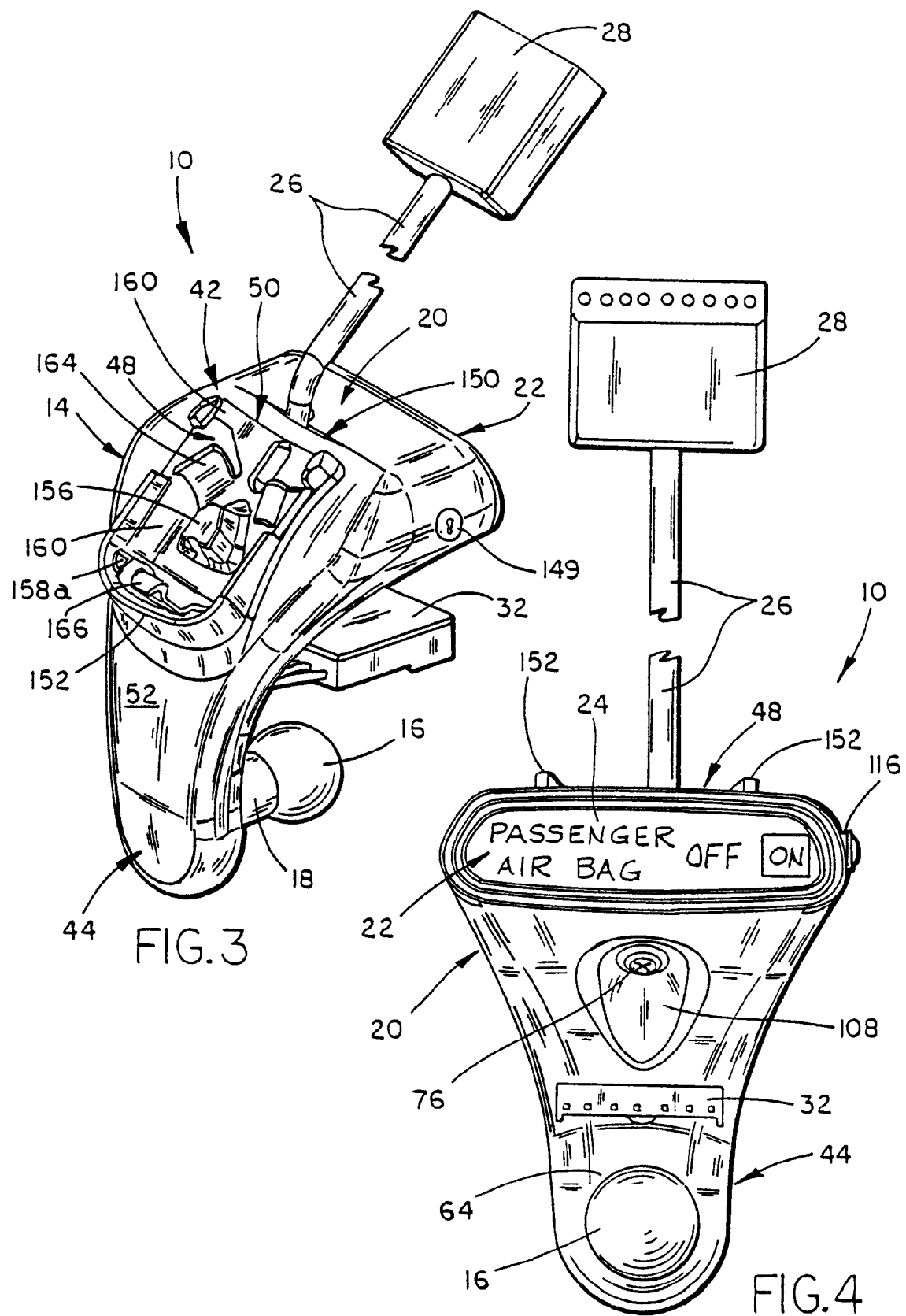

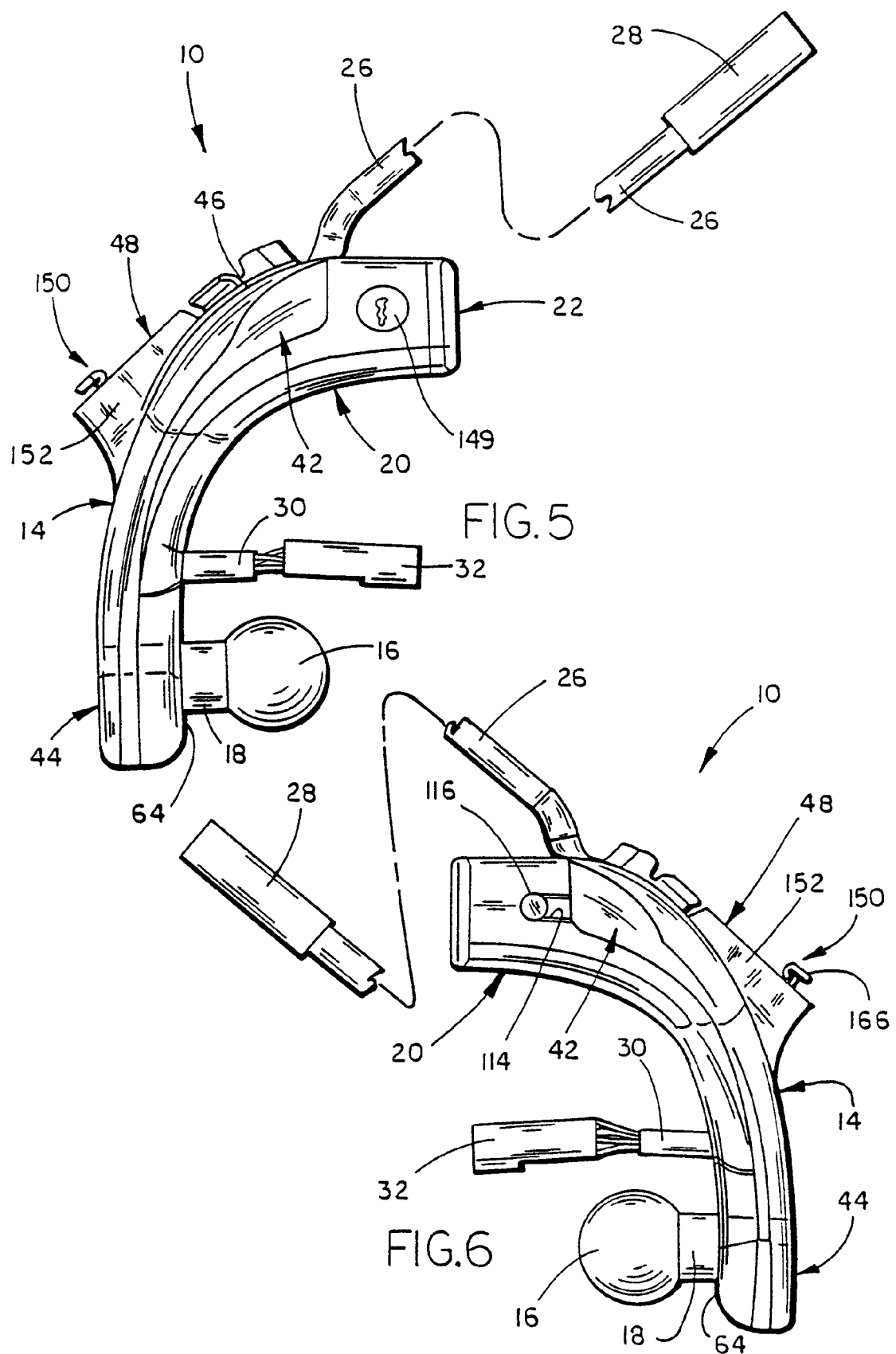

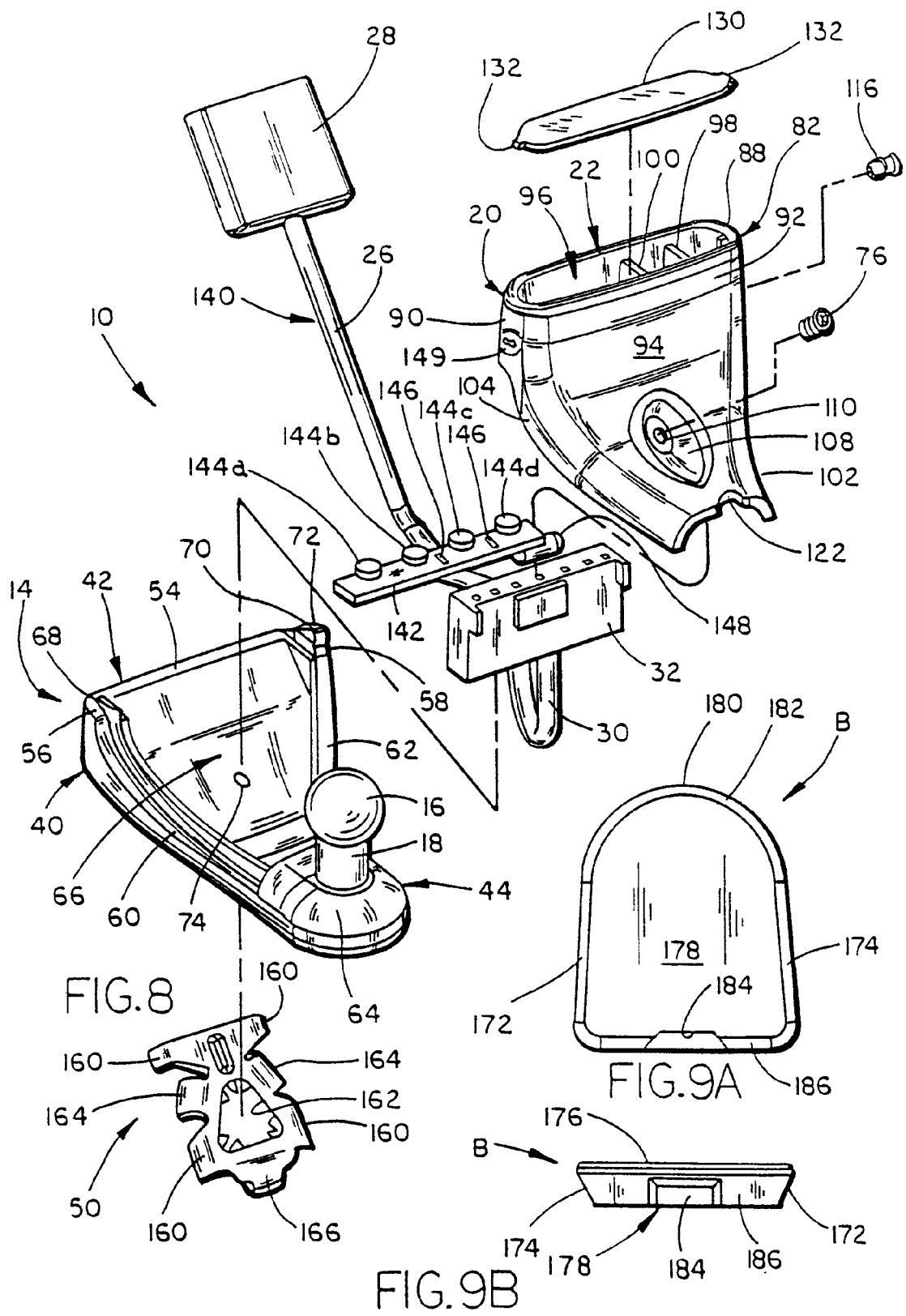

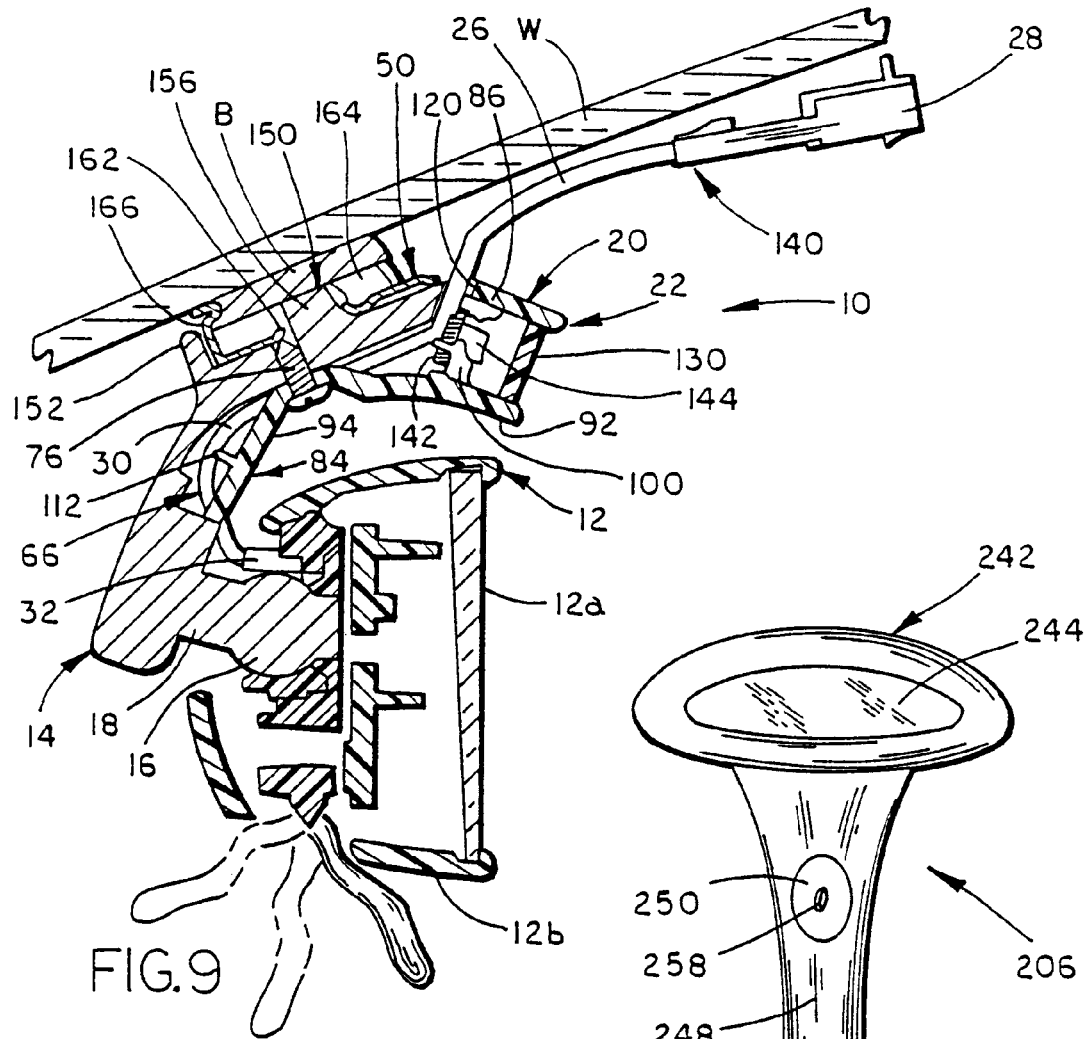

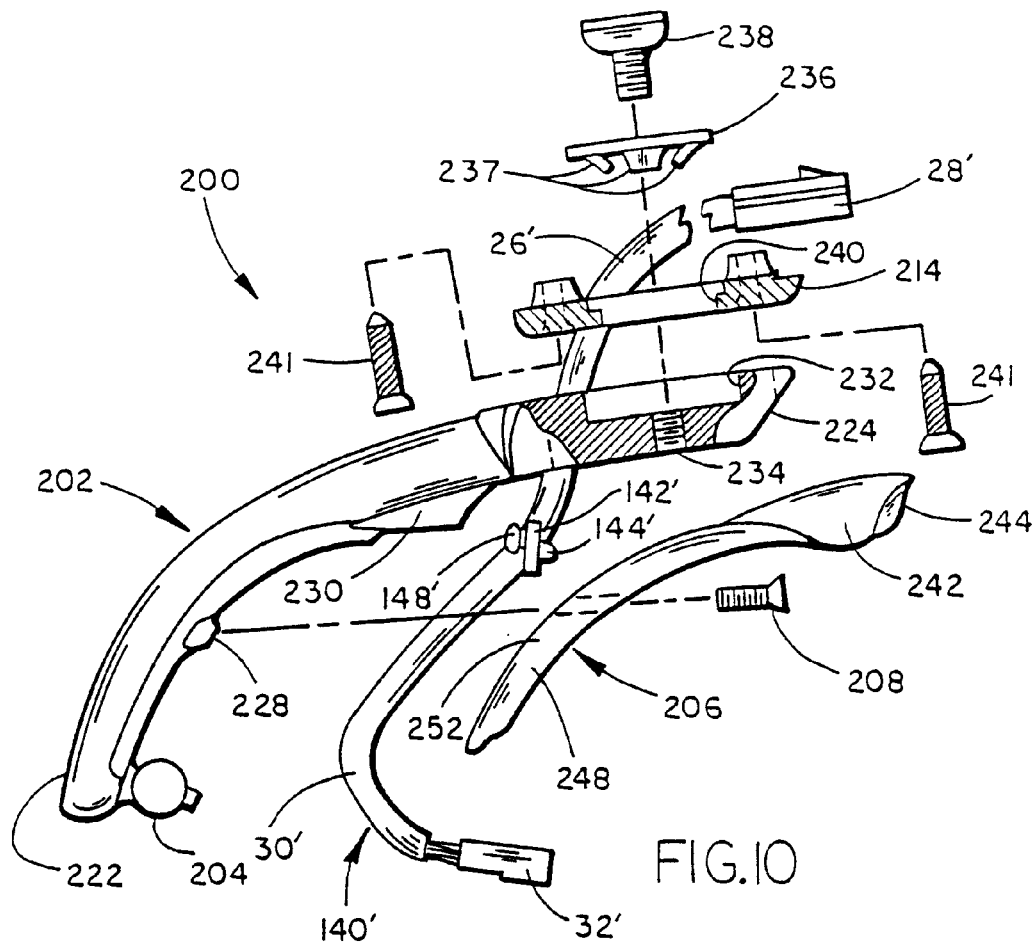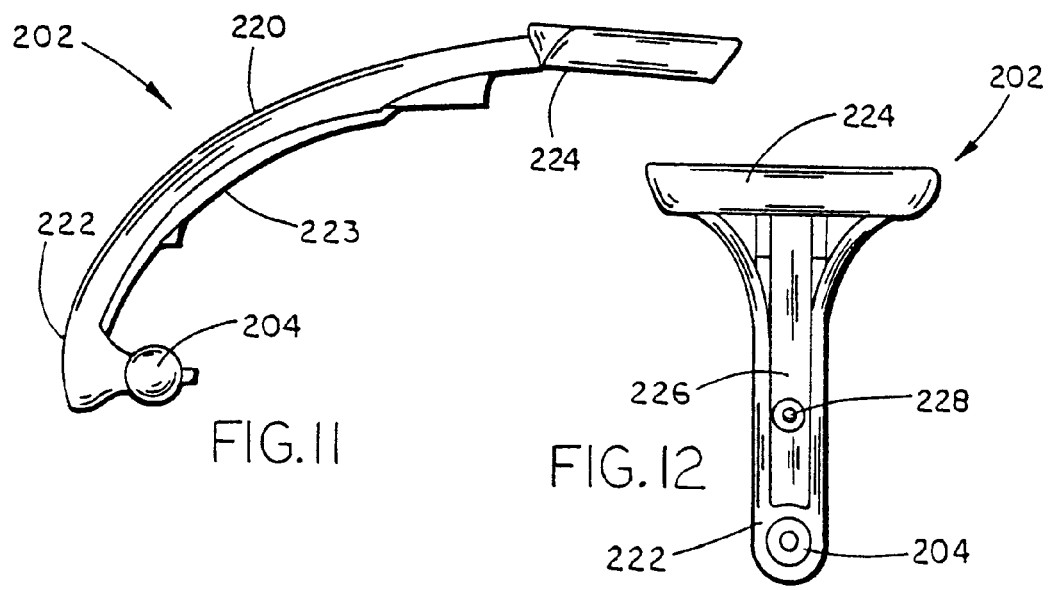

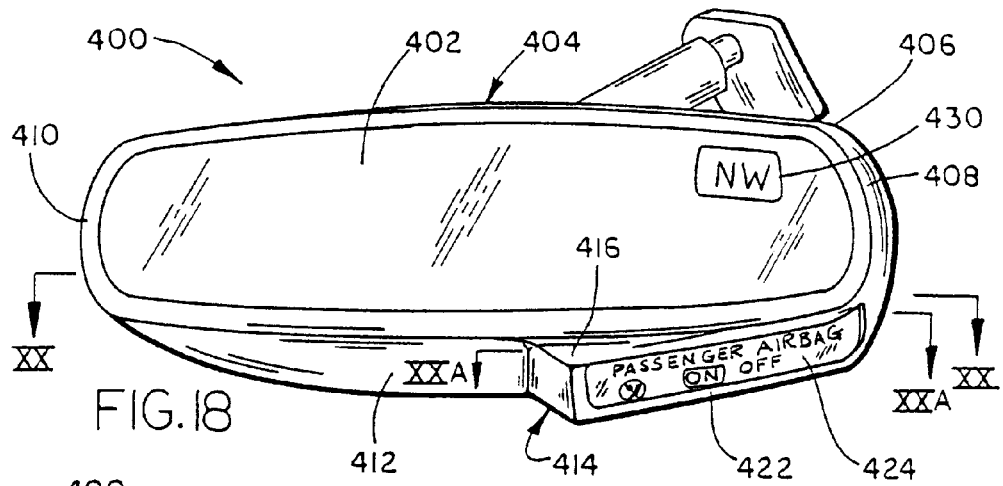
FIG.18
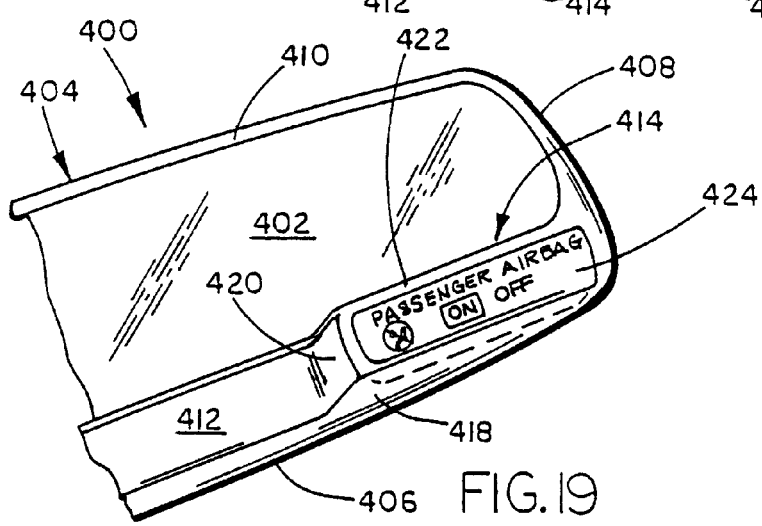
FIG.19
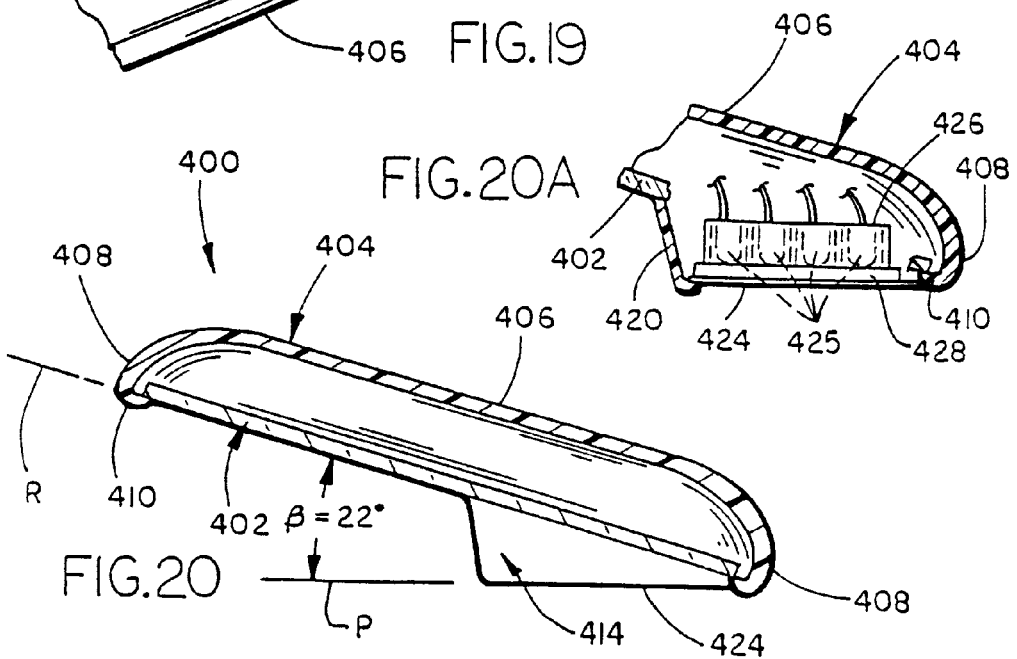
FIG.20A
FIG.20

INTERIOR MIRROR SYSTEM

CROSS-REFERENCE TO RELATED APPLICATIONS

This application is a continuation of U.S. patent application Ser. No. 11/369,380, filed Mar. 7, 2006, now U.S. Pat. No. 7,468,651, which is a continuation of U.S. patent application Ser. No. 10/913,186, filed Aug. 6, 2004, now U.S. Pat. No. 7,012,543, which is a continuation of U.S. patent application Ser. No. 10/298,194, filed Nov. 15, 2002, now U.S. Pat. No. 6,774,810, which is a continuation of U.S. patent application Ser. No. 09/993,813, filed Nov. 14, 2001, now U.S. Pat. No. 6,483,438, which is a continuation of U.S. patent application Ser. No. 09/734,440, filed Dec. 11, 2000, now U.S. Pat. No. 6,366,213, which is a continuation of U.S. patent application Ser. No. 09/244,726, filed Feb. 5, 1999, now U.S. Pat. No. 6,172,613, which is a continuation-in-part of U.S. patent application Ser. No. 09/025,712, filed Feb. 18, 1998, now U.S. Pat. No. 6,087,953, the disclosures of which are hereby incorporated by reference herein.

FIELD OF THE INVENTION

This invention relates to rearview mirror assemblies, and, more particularly, to a support for an independently adjustable rearview mirror for use in vehicles incorporating a display for information such as passenger air bag enable/disable status, as well as to rearview mirrors useful either with such supports or other supports and also incorporating vehicle information displays.

BACKGROUND OF THE INVENTION

Conventional passenger and cargo vehicles typically provide information concerning operation of the vehicle as well as time, outside temperature and other ancillary electronic displays in the instrument panel directly in front of the vehicle operator. Clocks, radios, CD players and the like are often located in the panel next to the driver for more convenient viewing and use by the other passengers. Viewing of one or more of the displays or gauges in the panel requires shifting of the driver's or passenger's eyes down to the panel from the view through the front windshield. The shift or redirection of the line of the sight from the road to the vehicle interior also requires refocusing of the viewer's eyes on the particular gauge or display. Such distraction can result in accident or injury, especially if the vehicle operator is presented with an emergency situation during such viewing. Also, a driver may not notice illumination of a critical warning display relating to occupant safety or vehicle operation (such as of disablement of a passenger air bag) when the display is located in the instrument panel due to the information clutter caused by the great number of other displays commonly found in the instrument panel.

Perhaps in recognition of these information display viewing problems, automobile and truck manufacturers have placed information in displays in consoles attached to the headliner of the vehicle above the front windshield. However, reference to the information in such consoles also requires a redirection of the viewer's line of sight from the road toward the vehicle roof. Such redirection is even more pronounced in cab-forward automobile designs in which the head position of the vehicle operator is moved forward with respect to the windshield/headliner boundary such that the displays in the headliner mounted consoles are even more difficult to view.

Other types of information displays have been provided directly in, or attached to, the interior rearview mirror assembly of the vehicle. These include displays located within the mirror case but behind the minor element which, of necessity, are limited in size so as not to interfere with the viewing area of the mirror itself. In others, an information display was mounted in the rim or edge of the rearview mirror case (such as in a bezel, lip or eyebrow portion) so as to avoid interference with the field of view of the mirror. However, the former type of through-the-reflective element display must be made integral with the reflective element in the mirror housing, and the latter type require that the mirror case is specifically designed for receipt of the display. The combined mirror and display in such constructions is also heavier than conventional mirrors resulting in increased vibration or oscillation and reduced quality images in the mirror surface. In addition, vehicle information display modules have been provided in housings removably attached to the rearview mirror support structure (such as in windshield button mounted units) such that with their displays are viewable by occupants of the vehicle.

Many of the above described information displays, and especially those provided in or attached to the interior rearview mirror of the vehicle, are primarily intended to provide information to the vehicle driver. In certain situations, however, it is important to provide information to the passenger or passengers in the vehicle and, particularly, the front seat passengers. An example is information concerning the operability of the Passenger Supplemental Inflatable Restraint (PSIR) system or air bag on the passenger side of the vehicle. Recent vehicle regulations allow control of the operation of a passenger side air bag system such that it may be switched off and disabled to prevent injuries when children are riding in the front passenger seat. It is important to allow the person in that front passenger seat to know whether the air bag system is operative or not. However, depending on the size of the passenger, and the seat position with respect to the position of the interior rearview mirror assembly, information displays primarily intended for reading by the vehicle driver may be difficult to see or read by smaller size passengers with the seat moved to its far forward position. Accordingly, there is also a need to provide information displays which are easily readable by front seat passengers regardless of the adjusted position of the interior rearview mirror assembly being used by the vehicle driver such that information important to that passenger can be provided.

In recognition of the above, the present invention was devised to provide for a vehicle rearview mirror support which would be substantially hidden from view by the vehicle occupants behind the rearview mirror housing but include an attachment to the vehicle and a connection allowing adjustment of the mirror position (such as a pivot) to accommodate various sizes of drivers, while having a display for information which avoids obstruction of the primary viewing zone of the vehicle operator through the front windshield but is visible adjacent, and preferably at the edge of, the rearview mirror housing. The support would require minimal vision shifting for conveying the displayed information to the vehicle operator while operating the vehicle, would alert vehicle occupants to critical and other vehicle pertinent information without confusion with other information displays, would provide improved vibration performance and clearer images in the rearview mirror itself, would house various vehicle accessories, and would meet governmental safety requirements for breakaway separation of objects in the vehicle cabin.

In addition, the present invention also provides for the positioning of information displays readable by vehicle occupants other than the vehicle-driver, and especially front seat passengers of a smaller size when the front seat is positioned in its far forward position. Such displays provide important information for the vehicle occupants other than the driver and may be combined with the support of the present invention such that important information can be simultaneously provided to both the vehicle driver and remaining vehicle occupants including a front seat passenger.

SUMMARY OF THE INVENTION

The present invention provides a rearview mirror support assembly incorporating a mirror stay providing support, preferably a pivot support, for an independently adjustable rearview mirror, a mount for attachment to a windshield mounted button or header mounted base which releasably couples the assembly to the vehicle for breakaway release upon impact such as during an accident, and an information display assembly for vehicles wherein information is displayed by an information display element to the vehicle operator and other occupants at a location adjacent to the viewing position of the rearview mirror, and preferably, at a position above the rearview mirror.

In certain vehicles including cab-forward designs, the present support and display can be positioned lower and within the driver's line of sight without obstructing the field of view. The information display is also distinct from other vehicle displays, such as on a header console.

Preferably, the information display is provided in a housing, more preferably a removable housing, which substantially conceals the electronics for the display element and the wiring for connecting the rearview mirror support and information display assembly to the vehicle electrical system while also providing electrical power to any electrically operated, added feature rearview mirrors which may be supported on the assembly.

In one form, the invention provides a rearview mirror support and information display assembly for vehicles including a mirror stay having a mount for mounting the stay within the interior of a vehicle and a mirror support for engaging and supporting a rearview mirror in viewing position for viewing by at least the driver of the vehicle. The assembly also includes an information display for displaying information visible to an occupant within the vehicle in which the assembly is mounted. The mirror stay and mirror support have portions concealed from view by the vehicle occupant by the rearview mirror when supported on the mirror support. The assembly projects from behind the rearview mirror such that said information display is positioned adjacent the rearview mirror when supported thereon such that said information display is viewable by the vehicle occupant.

Preferably, the information display element is an emitting display. In one embodiment, the information display element comprises a panel with differentially light transmitting and/or spectrally absorbing regions, the panel being backlit by a light source so that information is displayed by light transmission and/or spectral absorption at said region. The information is displayed as illuminated indicia such as illuminated tell tales, illuminated text, illuminated icons and the like by such panel and is preferably contrasted to the ambient light around the assembly. The light source is preferably concealed by a housing extending over a portion of the mirror stay, which housing may be releasably attached to allow for servicing. An electrical circuit connected to the light source may also be provided along with electrical wiring for connection to an electrically operated rearview mirror when supported on the mirror support and/or for connection to the electrical system of the vehicle in which the assembly is mounted. Preferably, the housing includes portions which conceal major segments of the electrical wiring from view by the vehicle occupants. In addition, it is preferred that a significant portion of the housing is concealed from view by the vehicle operator by the rearview mirror such that the housing extends outwardly from the mirror stay from a position behind and to the rear of the rearview mirror. Other preferred emitting information displays include vacuum fluorescent displays, electroluminescent displays, light emitting diode displays, cathode ray tube displays and the like.

In one form of the invention, the display element may include indicia thereon which are not visible until backlit by the light source. A preferred light source is a light emitting diode.

Non-emitting, passive display elements such as liquid crystal displays, including backlit liquid crystal displays, may also be used as well as other types of non-emitting displays. A variety of information display types may be formed such as multi-pixel displays, scrolling displays, reconfigurable displays and tell tales, all including varying types of wording, symbols, text or icons.

In another form of the invention, the electrical circuit includes a photo sensor which receives ambient light adjacent the assembly and controls the brightness of the light output from the light source in relation to the ambient light level adjacent to the information display or controls the intensity of an emitting display, such as of a vacuum fluorescent or LED digit, in proportion to the intensity of ambient light detected. Alternately, the light emitting intensity of the light emitting display can be slaved to the instrument panel lighting or controlled by a photo sensor in another part of the vehicle such as in an electro-optic rearview mirror, more preferably an automatic electrochromic mirror, twilight headlight sentinel or the like. Self-announcing, audible signals or strobes can also be used with the information display of the present invention.

Preferably, the present invention incorporates a support for adjustably supporting the rearview mirror adjacent to and, more preferably, below the information display and in viewing position for the vehicle operator. Alternately, the rearview mirror may be above the information display. In one form, such support is a ball pivot member extending outwardly from the mirror stay to allow adjustment of the mirror position independent from the information display. Other adjustable supports can also be used.

It is also preferred that the entire assembly including mirror stay, mirror support and information display, be releasably coupled to a mounting member on the vehicle such as a windshield mounted button or a header mounted base. The releasable coupling is adapted to release the entire assembly from the button or base when impacted such as during an accident to prevent injury. Various types of releasable couplings can be used such as spring clips and retainers, or resilient retaining flanges.

In other aspects of the invention, an rearview mirror assembly is provided which is useful either with the above-mentioned support assembly of the present invention as well as with other interior rearview mirror supports. The rearview mirror assembly has a rearview mirror and a support for mounting the assembly on a vehicle. The rearview mirror has a driver side end and a passenger side end. The driver side end is adapted to be closer to the position of the vehicle driver when the assembly is mounted in a vehicle on the support. The passenger side end is adapted to be closer to the position of a front seat passenger in the vehicle when the assembly is mounted in the vehicle on the support. The rearview mirror also includes a reflective mirror element which has a front surface lying in a mirror plane and faces the interior of the vehicle, and a housing for the mirror element, the housing being adjustably mounted to the support and including a back portion facing away from the vehicle interior, end portions, and a front portion facing the vehicle interior. The assembly also includes an information display which provides information to an occupant of the vehicle. The display has a display plane which is at an angle to the mirror plane to provide improved visibility of the display by a front seat passenger in the vehicle when the assembly is mounted on the vehicle.

In other aspects, the information display may project outwardly from the peripheral edge of the mirror housing toward the front seat passenger, or may be recessed within the mirror housing, either version being at a position above or below the reflective mirror element. The display may also be formed in the end of the mirror housing. Alternately, a display area may be provided within the field of the reflective mirror element itself and may be backlit with appropriate light sources such as light emitting diodes. In other forms, the rearview mirror assembly may include an information display within the field of the reflective mirror element, in addition to an information display in the peripheral edge or end of the mirror housing.

Advantages provided by this invention include adjustable support of a rearview mirror while providing information adjacent to the rearview mirror within the vehicle and visible by the vehicle operator and other vehicle occupants without obstructing the vehicle operator's normal field of view and without requiring major shift in the vehicle operator's line of sight to maintain adequate safety, the display preferably remaining fixed while the rearview mirror is adjusted about its pivot attachment to the support so that the driver can select the field of view for the reflective element housed within the rearview mirror independent of the viewing angle of the display attached to the mirror support and information support assembly. The combined mirror stay, support and information display is compact, light in weight and easily adaptable for attachment to the vehicle within the vehicle driver's line of sight, either by a windshield mounted button or a header mounted base. The information display is provided in an unobtrusive but easily readable format immediately adjacent the rearview mirror and can be provided with various types of emitting displays, audible signals or the like or passive displays. The electrical circuitry for the display is, preferably, substantially concealed as is the electrical wiring for connection of the assembly to the vehicle electrical system while also optionally providing concealed wiring for operation of electrically operated rearview mirrors including electro-optic mirrors, lighted mirrors and the like. In addition, the present information display can be coordinated easily with the remaining instruments and displays within the vehicle for automatic or manual operation or with intensity coordinated to the ambient lighting around the display and rearview mirror or in relation to the lighting on the instrument panel. In addition, inclusion of the electronics within the housing attached to the mirror stay allows for easy removal for servicing and positions the weight of the circuitry separately from the rearview mirror, thereby reducing vibration and oscillation and increasing visual clarity of the images in the mirror.

Additional advantages include the provision of an information display on the rearview mirror assembly adapted for ease of viewing and reading by a front seat passenger. Alternately, information displays can be included in the field of the reflective mirror element or on the peripheral edge of the mirror housing for the rearview mirror assembly, either separately from or in conjunction with the information display provided on the mirror support of the present invention.

These and other objects, advantages, purposes and features of the invention will become more apparent from a study of the following description taken in conjunction with the drawings.

BRIEF DESCRIPTION OF THE DRAWINGS

FIG. 3 is a rear perspective view of the assembly FIG. 2;

FIG. 4 is a front elevation of the assembly of FIGS. 2 and 3;

FIG. 5 is a right-side elevation of the assembly of FIGS. 2-4;

FIG. 6 is a left-side elevation of the assembly of FIGS. 2-4;

FIG. 8 is an exploded, perspective view taken from the bottom of the assembly of FIGS. 2-6;

FIG. 9 is a side sectional view of the assembly of FIGS. 2-8 when supporting a rearview mirror on a windshield mounted button and taken alone plane IX-IX of FIG. 1;

FIG. 9A is a plan view of a preferred windshield mounted button for mounting the present invention on a vehicle;

FIG. 9B is a bottom end view of the windshield mounted button of FIG. 9A;

FIG. 10 is an exploded, side view shown partially in section of a second embodiment of the rearview mirror support and information display assembly for vehicles of the present invention;

FIG. 11 is a side elevation of the mirror stay of the assembly of FIG. 10;

FIG. 12 is a front elevation of the mirror stay of the assembly of FIG. 10;

FIG. 13 is a front elevation of the information display housing of the assembly of FIG. 10;

FIG. 14 is a top plan view of the information display housing of the assembly of FIG. 10;

FIG. 18 is a perspective front view of a rearview mirror assembly of the present invention incorporating an information display extending toward the passenger side end of the assembly at an angle to the mirror plane, as well as an information display in the field of the reflective mirror element;

FIG. 19 is a fragmentary bottom perspective view of the information display area of the rearview mirror assembly of FIG. 18;

FIG. 20 is a sectional plan view of the rearview mirror assembly taken along plane XX-XX of FIG. 18 illustrating the information display area facing more toward the passenger side end of the assembly;

FIG. 20A is a fragmentary, sectional plan view of the rearview mirror assembly taken along plane XXA-XXA of FIG. 18 illustrating the information display area;

DESCRIPTION OF THE PREFERRED EMBODIMENTS

Figure 1:
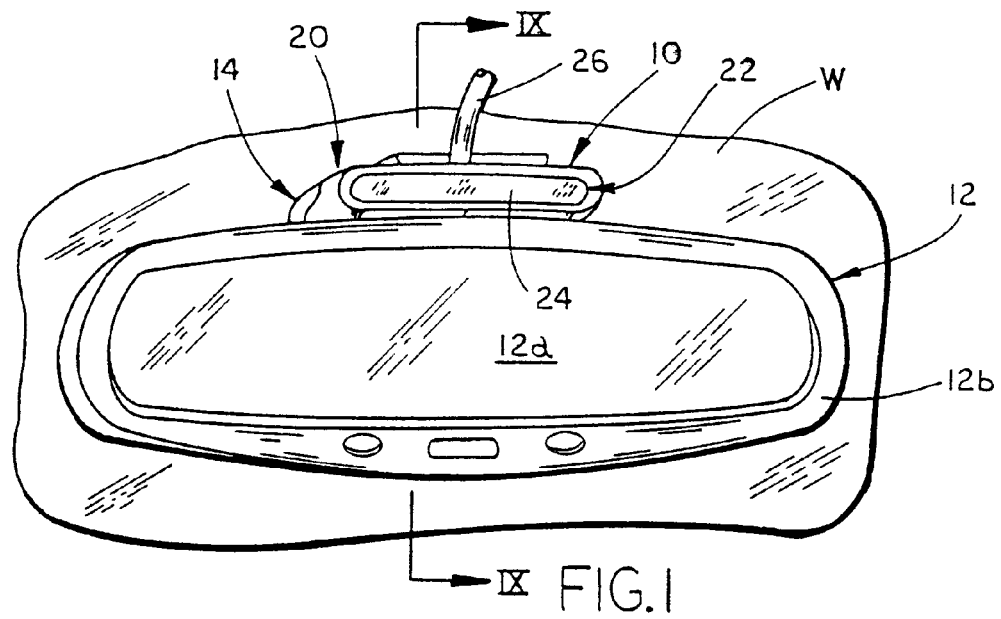
FIG. 1 is a front perspective view of the rearview mirror support and information display assembly for vehicles of the present invention showing an interior rearview mirror assembly in viewing position on the front windshield of a vehicle with the information display below the rearview mirror.

Referring now to the drawings in greater detail, FIG. 1 illustrates a first embodiment 10 of the unitary rearview mirror support and information display assembly for vehicles of the present invention. Assembly 10 is adapted to be releasably secured or coupled to the front windshield W of a vehicle below the headliner/header section of the interior roof in position for viewing of a rearview mirror 12 supported on assembly 10. Rearview mirror 12 comprises a reflective mirror element 12a housed in a mirror housing 12b. As shown in FIGS. 2-9, assembly 10 includes a rigid mirror stay 14 preferably formed from die cast zinc and an extending, mirror support ball pivot member 16 formed in one piece with the mirror stay on neck 18 at the lower end of the mirror stay. Rearview mirror 12 pivots about ball member 16. A housing 20, preferably having its contour matched to a portion of the mirror stay 14, is preferably removably fitted to the mirror stay, and includes an information display area 22 having a display element 24 for conveying information to the vehicle operator and other occupants of the vehicle interior. As is explained more fully below, housing 20 also includes electrical circuitry for operation of the display 22, which circuitry includes electrical wiring 26 and connector 28 for connecting the information display to the electrical system of the vehicle in which the assembly is mounted. In addition, the electrical circuitry includes electrical wiring 30 including a connector 32 providing electrical service from the vehicle to the rearview mirror assembly 12 which may be electrically operated as explained below. The entire assembly 10 is adapted for mounting to the inside surface of front windshield W by means of a windshield mounted button B (FIGS. 9, 9A and 9B) previously adhered to that surface.

The present invention is useful with a wide variety of interior rearview mirrors including manually-operated, prismatic day/night mirrors such as that shown in FIG. 9 and described in U.S. Pat. No. 4,948,242, as well as electrically-operated, compass mirrors such as that described in U.S. Pat. No. 5,253,109, or electrically-operated interior rearview mirrors incorporating map/reading lights such as those described in U.S. Pat. Nos. 4,646,210; 4,733,336; 4,807,096; 5,178,448; 5,669,698; 5,671,996; and copending, commonly assigned U.S. patent application Ser. No. 08/918,772, filed Aug. 25, 1997, to DeLine et al., now U.S. Pat. No. 6,124,886, the disclosure of which is hereby incorporated by reference herein; electrically-operated, automatically dimming mirrors such as those described in U.S. Pat. Nos. 4,793,690; 4,799,768; 4,886,960; and 5,193,029; and electrically-operated memory interior rearview mirrors. The disclosures of each of the above listed U.S. patents and patent applications is hereby incorporated by reference herein. The invention is particularly advantageous when used in conjunction with electrically-operated interior rearview mirrors integrally incorporating features including map lights, automatic dimming circuitry, etc., as such features necessarily limit the space available within the mirror case cavity. For example, the present invention is useful in conjunction with electrochromic rearview mirror assemblies such as automatic dimming rearview mirrors using an electrochromic mirror element of the electrochemichromic type as the variable, light transmitting element. Suitable electrochromic elements are described in U.S. Pat. Nos. 5,151,816; 5,142,407; 5,140,455; and in U.S. patent application Ser. No. 08/824,501, filed Mar. 27, 1997, to Varaprasad et al., now U.S. Pat. No. 5,910,854, the disclosures of all of which are hereby incorporated by reference herein. Each of these electrically-operated mirror assemblies is conveniently connected to the electrical system of the vehicle in which the present invention is mounted via the electrical wiring 26, 30 and connectors 28, 32 mentioned above and more fully described below.

As shown in FIG. 1, the operator of the vehicle is positioned to view outwardly through windshield W and in position to view images reflected from the rear of the vehicle in the mirror element of mirror assembly 12. Below the windshield and the position of assembly 10 and mirror 12 as shown in FIG. 1 is an instrument panel containing a variety of conventional instruments and displays such as a speedometer, tachometer, voltage indicator, fuel gauge and oil pressure gauge, as well as other instruments such as a clock, radio, audio tape/CD player; heater and air conditioning controls, and the like which may also be used by other occupants of the vehicle. Positioning of the information display 22 above the viewing position of mirror assembly 12 maintains an unobstructed view for the vehicle operator below the mirror assembly and above the instrument panel.

As shown in FIGS. 2-9, mirror stay 14 of assembly 10 includes a curved, contoured body 40 having a thin but wide upper area 42 tapering to a narrower lower area 44. Upper area 42 extends at an angle to the lower area 44, preferably an angle of between about 60☐ and 120☐, more preferably between about 70☐ and 100☐, and most preferably between about 85☐ and 95☐, as shown for assembly 10. When mounted as shown in FIG. 9, upper area 42 extends generally parallel to windshield W while lower area 44 extends downwardly away from the inside windshield surface to a position suitable for supporting rearview mirror assembly 12 via ball pivot member 16. In such position, the center of mass of the rearview mirror is substantially directly under windshield button B for vibration stability. Upper portion 42 includes a top surface 46 having a mounting area 48 for receiving a spring clip 50 and forming a mounting assembly 150 for retaining the entire assembly on windshield mounted button B as is explained more fully below. Upper surface 46 curves and merges into a rear surface 52 opposite the surface from which ball member 16 extends. The end of upper area 42 is defined by a peripheral edge 54 of generally U-shaped configuration having curved end edges 56, 58 thereon. End edges 56, 58 curve and merge into inwardly converging side edges 60, 62 which extend downwardly and terminate at raised mirror support area 64 at lower end 44 and from which ball member 16 extends. Within edges 54, 56, 58, 60, 62 is a hollow, recessed interior space 66 adapted to receive a portion of the electrical wiring 26, 30 forming a wire harness 140 (FIGS. 7-9) as will be more fully explained hereinafter. Adjacent end edges 56, 58 are spaced locating flanges 68, 70 adapted to fit within, locate and position a display portion 82 of removably housing 20 as explained below. Flanges 68, 70 have curved outer surfaces adapted to correspond to the curved inner surfaces of end walls 88, 90 of housing 20. In addition, flange 70 has a recessed end surface 72 which engages and traps an ambient light lens 116 fitted within housing 20 as is explained below. A circular aperture 74 formed within the middle of body 40 on the inner surface of upper portion 42 (FIG. 8) receives a fastening screw 76 for attaching housing 20 to the mirror stay.

As is also seen in FIGS. 2-9, housing 20 includes a configured body 80 having a wide, laterally elongated display portion 82 matching the shape of end edges 54, 56, 58 of mirror stay 14, and a curved, downwardly depending skirt 84. Display portion 82 and skirt 84 are preferably integrally molded in one piece from polycarbonate/acetal butyl styrene blend (PC/ABS), or polypropylene, polystyrene or another melt-processable polymer. Display portion 82 includes top wall 86, curved end walls 88, 90 and bottom wall 92 from which front wall 94 of skirt 84 extends continuously. Walls 86, 88, 90, 92 define an elongated interior space 96 (FIGS. 7 and 8) divided into smaller spaces or segments by spaced interior walls 98, 100 which extend perpendicularly between top wall 86 and bottom wall 92. Extending outwardly and downwardly along the inwardly converging edges of front wall 94 are peripheral side walls 102, 104 defining a tapered, hollow interior space 106 on the inside surface of skirt 84. Front wall 94 includes a recess 108 centered therein and through which a screw receiving aperture 110 extends. At the lower end of recess 108 on the interior surface of front wall 94 is an upstanding, elongated wall 112 providing a strain relief flange for engaging the electrical wiring of wire harness 140 when housing 20 is assembled to mirror stay 14. At the rear edge of left end wall 88 of display portion 82 of housing 20 is a semi-circular, elongated recess 114 adapted to receive a transparent, generally circular lens 116 therein to direct ambient light from the area adjacent assembly 10 to a photo sensor 148 mounted on the electrical circuit 142 forming part of wire harness 140 as explained below. Lens 116 includes a series of segments or flanges 118 at its inner end enabling the lens to be snap fit into recess 114 and retained therein. A semi-circular recess 120 is formed in the rear edge of top wall 86 through which electrical wire/cable 26 of wire harness 140 extends for connection to the electrical system of the vehicle in which assembly 10 is mounted. Similarly, a semi-circular recess 122 is formed in the lower edge of front wall 94 of skirt 84 through which wire/cable 30 from harness 140 extends forwardly to position connector 32 adjacent the rear surface of rearview mirror assembly 12 for connection thereto.

At the front of display portion 82 of housing 20 is a display element 130. Display element 130 is preferably generally planar and formed from a polycarbonate sheet, and is preferably insert molded within housing 20 when the housing is injection molded. Alternately, element 130 can be separately formed and include tabs 132 on either end adapted to fit within recesses or apertures formed on the inside surfaces of ends 88, 90 of housing 20 for assembly after molding of housing 20. In either case, element 130 abuts against the coplanar edges of interior walls 98, 100 which are recessed inwardly from the peripheral edge of display portion 82 (FIGS. 8 and 9).

Figure 2:
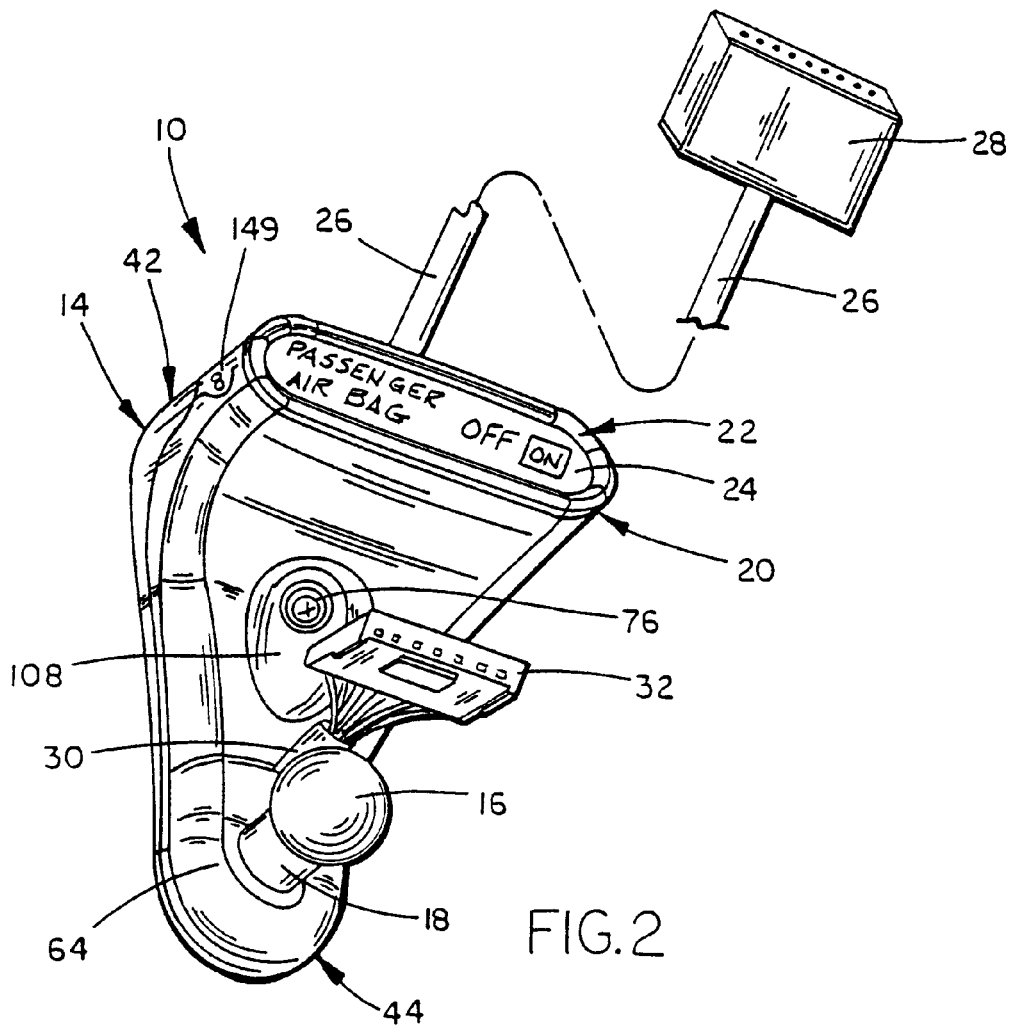
FIG. 2 is a front perspective view of the rearview mirror support and information display assembly of the present invention.
Figure 7:
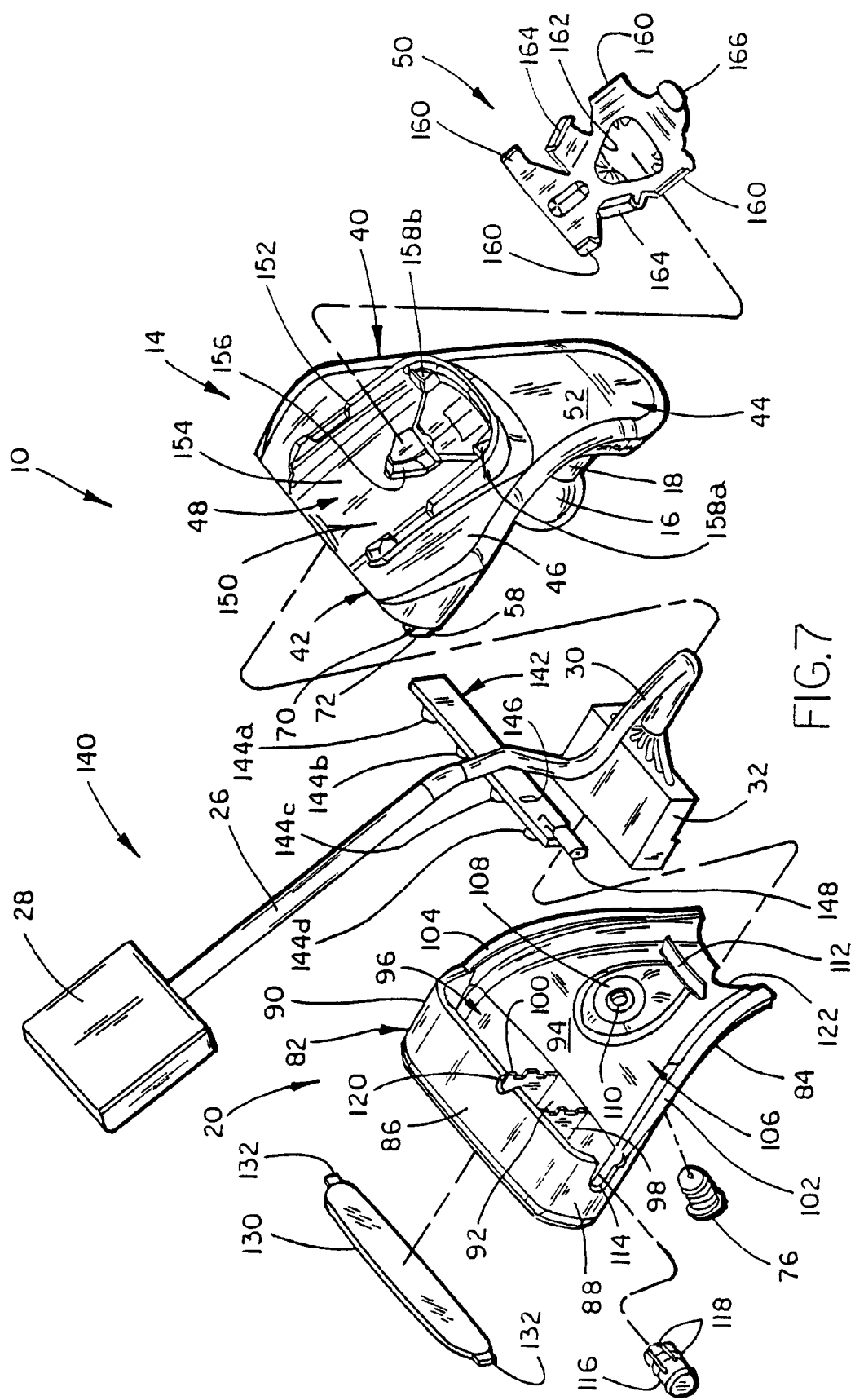
FIG. 7 is an exploded, perspective view taken from the top of the assembly of FIGS. 2-6.

Prior to mounting display element 130 within housing 20 in the manner described above, various indicia comprising alpha-numeric displays or word, symbol or icon displays may be printed or formed on the front or rear surface of the element as shown in FIGS. 2 and 4. Such words, numerals, text, symbols, tell tales, icons or other indicia may be differentially light transmitting and/or spectrally absorbing regions on element 130. Preferably, the front exposed surface of display element 130 is unprinted, plain or "dead fronted," and may be opaque or black in color and have a desired texture thereon. Rear surface of element 130 preferably includes various words, symbols, icons or other indicia adapted to be visible at non-opaque regions of element 130, through the front surface when backlit such as by light sources 144 provided on circuit 142 included in wire harness 140 as described below. Accordingly, when backlit, such indicia are visible to both the vehicle operator and any passengers or other occupants within the vehicle at the position above the rearview mirror as shown in FIG. 1.

The display on element 130 may comprise a multi-pixel display, scrolling display, reconfigurable display, or tell tale forming varieties of an emitting display formed with one or more light sources of the type described below. Alternately, indicia could be imprinted on a contrasting background on the exterior, front surface of display element 130 for visibility without backlighting or other illumination and, thus, may comprise a passive display. Alternately, display element 130 could be transparent.

As shown in FIGS. 2 and 4, the preferred indicia display for assembly 10 relates to the operation and enablement of supplemental occupant restraint systems, known as air bags, especially on the passenger side. Recent governmental regulation changes allow disablement of passenger side air bags by the vehicle owner in certain situations. This display indicates to the vehicle occupants whether the passenger side air bag is enabled (on) or disabled/suppressed (off). Such information display(s) serves as an indicator, and provides notification to the driver and front outboard passenger whether the Passenger Side Inflatable Restraint (frontal air bag and, in some cases, frontal and side air bags), referred to as PSIR, is/are active or suppressed. The information display serves as a status indicator intended to notify the driver and front outboard passenger of the state of the PSIR (enabled or suppressed). The indicator receives the PSIR status from an automatic occupant sensor and displays the PSIR status through the use of light emitting diodes, tell tales, or the like. The status indicator can be part of the vehicle Supplemental Inflatable Restraint (SIR) subsystem. Information display 22 can also present other displays and functions related to vehicle operation, such as engine coolant temperature, oil pressure, fuel status, battery condition or voltage, cellular phone operation, E-Mail message receipt, compass display, time or the like.

Fitted within and between housing 20 and mirror stay 14 when assembled together is a wiring harness 140 including electrical wires/cables 26, 30 and connectors 28, 32 mentioned above, as well as a circuit board 142 containing electronic/electrical circuitry for operating the information display 22 and/or other functions in the supported rearview mirror assembly or vehicle. Circuit board 142 is adapted to be mounted on the rear edges of interior walls 98, 100 by means of projecting tabs 99, 101 received in openings 146 formed in circuit board 142. Tabs 99, 101 may then be heat staked or formed over to retain the circuit board in place without vibration. Circuit board 142 preferably includes a series of emitting elements or light sources 144 mounted at spaced positions on its front surface. Preferably, emitting sources 144 are light emitting diodes (LEDs) adapted to provide backlighting of display element 130 when the circuit board 142 is positioned on the rear edges of interior walls 98, 100. A preferred light emitting diode is a NICHIA white light emitting diode available from Nichia Chemical Industries of Tokyo, Japan, under Model Nos. NSPW 300AS, NSPW 500S, NSPW 310AS, NSPW 315AS, NSPW 510S, NSPW 515S, and NSPW WF50S, and provides low level, non-incandescent, white light for illuminating the indicia on display element 130. Such white light emitting diodes preferably emit light with color when measured on such as the ICI Chromaticity Diagram with an x color coordinate in the range from about 0.2 to about 0.4, and a y color coordinate in the range from about 0.25 to about 0.425, more preferably, an x color coordinate in the range from about 0.25 to about 0.35, and a y color coordinate in the range from about 0.25 to about 0.4, most preferably, an x color coordinate of about 0.3 0.06 and a y color coordinate of about 0.32 0.08. Other LEDs providing light in colors other than white, such as amber or red, may also be used. Preferably, light emitting diode sources 144a and 144b are connected to operate at all times during the operation of the vehicle so as to continuously illuminate the words "passenger air bag." The remaining two LEDs 144c, 144d are aligned with the words "off" and "on," respectively, and provide backlighting for those words individually. LED 144c or 144d is selectively operated to illuminate the status of the air bag, either off (disabled) or on (enabled). Interior walls 98, 100 are spaced off center within the hollow interior 96 of display portion 82 of housing 20 so as to direct light from LEDs 144c and 144d to those words respectively at one end of the display element.

Alternately, other emitting elements can be used to display information (including alpha-numerical information) such as incandescent displays, vacuum fluorescent displays, electroluminescent displays, light emitting diode displays, or cathode ray tube displays. The various displays useful in this invention can also be reconfigurable so that certain critical alpha-numeric or symbolic information, icons or other indicia will override or supplant normal, primary information for a selected period of time such as for a traffic warning, vehicle blind spot presence detection, engine operation change or deficiency, compass heading change, incoming cellular phone call or the like.

Another display useful in place of the printed or formed indicia on element 130, or adjacent to element 130, in the event that element is transparent, is a passive or non-emitting liquid crystal display which can also be backlit by emitting light sources such as LEDs 144 described above.

Also included on circuit board 142 in addition to the normal electrical circuitry components such as resistors and capacitors is a photo sensor 148 which extends parallel to circuit board 142 and transverse to the axes of LEDs 144. When circuit board 142 is mounted within display portion 82 of housing 20 on interior walls 98, 100 as described above, photo sensor 148 will be axially aligned with cylindrical lens 116 so that ambient light adjacent the assembly 10 is directed and focused on photo sensor 148. Photo sensor 148, which is preferably a VT 900 Series cadmium sulfide photo cell available from EG & G Vactec of St. Louis, Mo., in conjunction with the remaining circuitry on circuit board 142, is adapted to control the intensity of the light emitted from light sources 144 in relation to the ambient light around the assembly 10. Alternately, an L-32P3 photo transistor, available from King Bright Ltd. of City of Industry, California, could also be used as photo sensor 148. Thus, a high ambient light level is sensed by photo sensor 148 and the circuitry increases the electrical current applied to LEDs 144 such that the backlit display will be brighter and consequently more easily visible at such high light level periods. At night or other low ambient light level periods, the amount of current applied to LEDs 144 is reduced so as to coordinate the illumination of display 22 to the surrounding conditions while maintaining visibility of the information displayed. Alternately, photo sensor 148 need not be included and the intensity or brightness of the information display 22 can be operated in tandem with the lighting intensity for the instruments on the instrument panel in the vehicle or slaved off the switching and dimming circuitry or rheostat for such instruments. Likewise, should the use of a photo sensor be desired, a photo sensor on another part of the vehicle such as in an electro-optic rearview mirror supported by assembly 10 can be connected to the emitting sources 144 through appropriate circuitry to control their intensity in relation to the ambient light level. Such a remotely located photo sensor could also be located in another area of the vehicle for a system such as in a twilight headlight sentinel which automatically switches the vehicle headlamps on/off at dusk/dawn.

In addition, the circuitry included on circuit board 142 may also share components and provide circuitry for the electrical components in the electrically operated mirror supported by assembly 10 so as to eliminate the need for mounting such circuitry within the rearview mirror assembly itself. This helps reduce the vibration response of such lightened mirror and provides clearer images visible thereon.

The passenger side air bag on/off signal may be derived from various types of seat occupancy detectors such as by video surveillance of the passenger seat as disclosed in co-pending, commonly-assigned U.S. patent application Ser. No. PCT/US94/01954, filed Feb. 25, 1994, published as International PCT Application No. WO 94/19212, on Sep. 1, 1994, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which assembly 10 is mounted as described in co-pending, commonly-assigned U.S. patent application Ser. No. 08/799,734, filed Feb. 12, 1997, now U.S. Pat. No. 5,786,772, the disclosure of which is hereby incorporated by reference herein. Optionally, as shown in FIGS. 2, 3, 5 and 8, a switch 149 adapted for operation solely by the ignition key which fits the ignition switch of the vehicle in which assembly 10 is mounted may be mounted in housing 20 such as in end wall 90 or at another location on the assembly. Switch 149 is connected through circuit board 142 or wire harness 140 to the passenger side air bag and also provides manual control over operation of that air bag by the owner or user of the vehicle. Alternately, switch 149 can be user operated by other than the vehicle ignition key.

In addition to the status of the operation of the passenger side air bag, other vehicle functions or information can be displayed on information display 22 as mentioned above including engine coolant temperature, oil pressure, compass direction, tire pressure, fuel status, voltage, time, outside temperature or the like. Such information can be displayed simultaneously with the passenger side air bag information such as through an appropriate switch, or displayed in interrupted fashion and/or overridden so as to warn the vehicle operator when the engine is first started. In addition, self-announcing displays can be incorporated in information display 22 in order to be noticed when the ignition switch for the vehicle is turned to the "accessory on" position. Such self-announcing displays can include strobe or intermittently operated light sources and/or emitting display elements, or audible signals adapted to sound for a time period of between about two seconds to one minute or longer after which the display reverts to its normal illuminated condition.

In addition, housing 20 may be formed with a blank panel in place of display element 130 in order to conceal and position the electrical wiring/cable from a wire harness designed to provide electrical connection from the vehicle electrical system to an electrically operated rearview mirror mounted on the mirror support ball member 16. In such case, housing 20 only performs a wire cover/concealment function.

As is best seen in FIGS. 3 and 5-7, assembly 10 is releasably mounted for breakaway separation from the windshield mounted retainer or button B by means of a resilient, breakaway mounting system 150 at mounting area 48. Mounting assembly 150 preferably is of the type disclosed in co-pending, commonly-assigned U.S. patent application Ser. No. 08/781,408, filed Jan. 10, 1997, now U.S. Pat. No. 5,820,097, the disclosure of which is hereby incorporated by reference herein. Mounting assembly 150 includes a peripheral wall 152 outlining a rectangular retainer receiving area 154, a central button support 156 and spaced lateral button supports 158a, 158b. A resilient spring clip 50 formed from spring metal is received in retainer receiving area 154 and secured therein by means of retaining flanges 160 fitted under a shoulder on the interior of wall 152. A central aperture 162 is interference fitted over button support 156, while upstanding, resilient flanges 164 and resilient end flange 166 extend outwardly for engagement with windshield mounted button B as shown in FIG. 9.

As shown in FIGS. 9, 9A and 9B, windshield mounted button B is of the type including a peripheral edge 170 having inwardly converging or angled side edges 172, 174 which taper inwardly from the outermost mounting surface 176 which engages the button supports 156, 158 to the smaller attachment surface 178 engaging the inside windshield surface, and a curved edge 180 which extends from one side edge to the other side edge and along the curved top end 182. Curved edge 180 is angled inwardly for its full extent as are the side edges. Side edges 172, 174 converge toward one another as they extend toward top end 182 and provide the button B with an overall double tapered shape. In addition, button B includes a recess 184 in its lower end surface 186 which is spaced from attachment surface 178 for receipt of the resilient end flange 166. When spring clip 50 is mounted on mounting area 48 to provide the mounting assembly 150 in the above manner, resilient flanges 164 and resilient end flange 166 engage edge 180 and recess 184 of windshield button B at spaced positions and center the button therebetween and hold the button against button supports 156, 158. However, when assembly 10 is subjected to an impact force, flanges 164 and end flange 166 flex to release the assembly from the button to prevent injury.

Accordingly, assembly of housing 20 to mirror stay 14 will now be understood. Mirror stay 14 may be provided with a manual or electrically-operated rearview mirror assembly 12 as described above and with spring clip 50 received in mounting area 48 as shown in FIG. 9. Similarly, housing 20 may be fitted with wire harness 140 such that circuit board 142 is aligned within the rear of the opening to display portion 82 with tabs 99, 100 fitted within openings 146 and formed over to retain the circuit board in place. In this position, photo sensor 148 is aligned with lens 116 previously positioned in aperture 114 of housing 20. LEDs 144a, 144b are aligned between interior wall 100 and end wall 90, LED 144c is aligned between interior walls 98, 100, and LED 144d is aligned between end wall 88 and interior wall 98. Electrical wiring 26 is positioned within recess 120. Electrical wiring 30 is positioned on one side or the other of recess 108 within space 106 and extends out through recess 122 at the lower end of skirt 84. Thereafter, housing 22 is aligned with mirror stay 14 such that locating flanges 68, 72 are positioned adjacent the interior surfaces of end walls 88, 90 and surface 72 is aligned with the side of lens 116. The housing and mirror stay are then moved toward one another such that edges 102, 104 are received on edges 60, 62 and threaded screw 176 or other fastener is passed through aperture 110 into aperture 74 in the mirror stay to secure the housing in place and form a unitary support assembly with the mirror stay. The edges of the housing and mirror stay mate and are flush with one another. After assembly, electrical wiring 30 and connector 32 project toward the rearview mirror assembly for connection thereto from the lower end of assembly 10, while electrical wiring 26 and connector 28 project from the top surface of the assembly for connection to the vehicle electrical system at the headliner/header area of the vehicle above the windshield. The assembly may then be snapped onto previously positioned windshield button B for retention thereon in position for viewing by the vehicle operator in the manner described in U.S. Pat. No. 5,820,097, and connector 28 may be engaged with the vehicle electrical system to provide electrical power for the information display 22 and the electrically-operated mirror assembly 12. In this position, lower area 64 and a significant portion of the remainder of assembly 10 is concealed from view of the vehicle driver and at least some of the vehicle occupants by rearview mirror 12 as shown in FIGS. 1 and 9.

Rearview mirror assembly 12 is independently adjustable of the position of mirror stay 14 and housing 20 when assembly 10 is mounted on windshield mounted button B. Rearview mirror 12 includes a generally spherical socket received over ball member 16 such that assembly 12 may be pivoted in a universal manner while wiring 30 flexes to allow such movement. Thus, the rearview mirror assembly may be positioned to the individual needs of the various operators/drivers of the vehicle, while display element 130 remains independently, and preferably fixedly, positioned immediately adjacent, and preferably above, the rearview mirror assembly for viewing by all such drivers. Alternately, ball pivot member 16 could be a double ball pivot assembly or a mount for attaching a channel mount and an associated support assembly for a rearview mirror assembly as show and described in commonly assigned U.S. Pat. Nos. 5,100,095 and 4,930,742, the disclosures of which are hereby incorporated by reference herein. It is within the scope of this invention to configure the mirror stay and information display such that the display element is positioned immediately adjacent bottom, side or other portions of the rearview mirror while the display remains visible to vehicle occupants. In the event of an accident, impact against either rearview mirror assembly 12 or any portion of assembly 10 allows release and separation of the entire assembly and supported rearview mirror assembly from windshield mounted button B by means of mounting assembly 150 as described above.

With reference FIGS. 10-14, a second embodiment 200 of the rearview mirror support and information display assembly for vehicles is shown. Assembly 200 is similar to assembly 10 and is adapted to support a rearview mirror assembly for independent adjustment by means of a rigid mirror stay 202 having an extending spherical ball member 204 thereon for receipt of a rearview mirror assembly. A housing 206 is removably secured over mirror stay 202 by means of a threaded fastener 208 and encloses and conceals at least a portion of wire harness 140 therewithin. However, rather than being releasably coupled to a windshield mounted button as in assembly 10, assembly 200 is adapted for releasable coupling to a header mounted base 214 as is more fully described hereinafter.

As is best seen in FIGS. 11 and 12, rigid mirror stay 202 includes a curved body 220 extending from a lower rearview mirror mounting area 222, from which ball member 204 extends on the forward side thereof, to an upper header mounting area 224. The front side 223 of mirror stay body 220, which faces the interior of the vehicle and the vehicle occupants, includes a recessed area 226 in which is formed an aperture 228 for receiving fastening screw 208 to secure housing 206 thereto and a raised, projecting housing mounting area 230. Upper header mounting area 224 includes a mounting recess 232 which receives a flanged spring washer or clip 236 and threaded aperture 234 which receives a headed retainer or fastening screw 238 coupling the mirror stay to the base member 214 for releasable breakaway separation upon impact in the manner described in U.S. Pat. No. 5,100,095, incorporated by reference above. Flanged washer 236 is received in shouldered aperture 240 of base member 214 such that flanges 237 project downwardly through the aperture and into aperture 232 of the mirror stay. A headed screw 238 is inserted through the aperture formed by spring flanges 237, through aperture 240 and into threaded aperture 234 in mirror stay 202. Thereafter, base 214, which is wider than header mounting area 224, is secured to the vehicle roof adjacent the top edge of the front windshield by screws 241 such that the mirror stay curves downwardly along the inside surface of the windshield to support a rearview mirror assembly in viewing position below the top edge of the windshield.

Prior to mounting mirror stay 202 on the vehicle in the manner described above, a wire harness 140', similar in all respects to wire harness 140, is inserted through an aperture in header mounting area 224 such that electrical wiring 26' and connector 28' extend therefrom and through base member 214 for connection to the vehicle electrical system. A circuit board 142', including LEDs or other light sources 144' and photo sensor 148', extends below the mirror stay such that electrical wiring 30' and connector 32' are positioned adjacent the lower portion 222 of the mirror stay. Housing 206 is connected to circuit board 142' in a manner similar to that in assembly 10 and includes an information display portion 242 including a display element 244 which is fitted therein or insert molded when housing 206 is formed preferably by injection molding. As shown in FIG. 13, information display portion 242 is generally oval or elliptically shaped and is adapted to fit over projection 230 and secure circuit board 142' between a series of internal walls 246 (FIG. 14) and the projection 230. Curving downwardly from information display portion 242 is a hollow skirt 248 having a recess 250 in its outer surface and a pair of converging side edges 252, 254 which form a hollow interior 256 through which electrical wiring 30' extends to the lower portion 222 of the mirror stay. A screw receiving aperture 258 extends through recess 250 for receipt of fastener 208 to secure housing 206 on the front surface of mirror stay 202 with wire harness 140' therebetween. Accordingly, when housing 206 is secured to mirror stay 202 with fastener 208, electrical wiring 26' and 30' extend through the interior space 256 and project upwardly for connection to the vehicle and downwardly for connection to the rearview mirror assembly when mounted on ball member 204 but are concealed from view from the vehicle occupants by the housing. Wire harness 140', circuit board 142', light sources 144' and photo sensor 148' operate in a manner like that described above for wire harness 140 to provide backlit illumination of indicia formed on display element 244. Alternately, other displays as described above could be used in housing 206.

In the event assembly 200 is impacted by a vehicle occupant such as during an accident, force applied to housing 206, mirror stay 202 or any rearview mirror mounted thereon will create a pivot action pulling screw 238 through flanges 237 of spring washer clip 236 allowing release of the entire assembly including mirror stay 202 and housing 206 from base member 214.

The rearview mirror support and information display assembly 10, 200, or the rearview mirror attached thereto, or any rearview mirror assembly in the vehicle, may also incorporate an in-vehicle train approach warning system. Such a train approach warning system alerts the driver of a vehicle of the imminent arrival of a train at a railroad-highway crossing. Such a warning system can activate audible and/or visual alarms in the vehicle if a train is approaching. A hazard warning is preferably displayed at the interior mirror (optionally, also/or at an exterior mirror), most preferably at the rearview support and information display assembly of this present invention. Such train warning display may override any existing display so that the driver is fully alerted to any potential hazard. Vehicle-to-roadside communication antennas (such as are available from 3M Corp. of St. Paul, Minn.) can be attached to railroad signs, crossing barriers, and the like, and can transmit to antennas mounted on the vehicle (located such as within assembly 10, 200, within, on or at an interior mirror assembly, an interior cabin trim item, or an exterior sideview mirror assembly). A trackside communications system is available from Dynamic Vehicle Safety Systems of Amarillo, Tex. that detects signals from a train approaching a crossing, and transmits these to such as a sign along the road that forewarns of a railroad crossing ahead. The sign then sends a signal to the receiver unit (located at, within, or on the interior rearview mirror assembly, for example) in the vehicle, which in turn activates a warning such as at display 22 in assembly 10, 200, or at rearview mirror 12.

The rearview mirror support and information display assembly 10, 200, or the rearview mirror 12, or any rearview mirror assembly in the vehicle, such as the interior rearview mirror assembly, may also incorporate a vehicle tracking unit which tracks where a vehicle is located, and is thus useful should the vehicle be stolen, or should the driver need emergency assistance at a remote location whose address is unknown to the driver. Such a system is available from ATX Technologies of San Antonio, Tex. and uses global positioning satellites and cellular communications to pinpoint the location of the vehicle. Assistance can be rendered by the ATX supplied unit (known as an On-Guard Tracker™ unit) on how to handle emergency situations, direction can be rendered, remote unlocking of door locks can be achieved if the owner□s keys are misplaced or locked in the vehicle. Messages (such as e-mail messages, hazard warning messages, vehicle status messages, page messages, etc.) can be displayed at display 22 or at the interior mirror assembly, where the driver is always regularly looking as part and parcel of the normal driving task.

It is also possible to incorporate low level console or instrumentation lighting for vehicles in assemblies 10, 200 by fitting a low level, non-incandescent, light emitting light source such as a light emitting diode on assemblies 10, 200 for illumination of instrument panel or console areas as disclosed in commonly-assigned U.S. Pat. No. 5,671,996, the disclosure of which is hereby incorporated by reference herein. A variety of emitting sources may be used as the light emitting source, including, but not limited to, very high intensity amber and reddish-orange light emitting diode (LED) sources, such as solid state light emitting diode LED sources utilizing double heterojunction AlGaAs/GaAs material technology, such as very high intensity red LED lamps T-1¾ (5 mm) HLMP-4100/4101, available from Hewlett Packard Corporation, Palo Alto, Calif., or which use transparent substrate aluminum indium gallium phosphide (AlInGaP) material technology, commercially available from Hewlett Packard Corporation, Palo Alto, Calif. under the designation T-1¾ (5 mm) HLMT-DL00, HLMT-CH00, HLMT-CL00, HLMT-CH15, HLMT-CL15 and HLMT-DH00, or which use InCaAlP material technology available from Toshiba Corporation of Latham, N.Y., such as under the designation TLRH180D. Light emittance colors provided by such solid-state sources include orange, yellow, amber, red and reddish-orange, desirably without need of ancillary spectral filters. The preferred solid-state light emitting diodes, at 25□C. or thereabouts, operate at a forward voltage of about 2 volts to about 5 volts; have a luminous intensity (measured at the peak of the spacial radiation pattern which may not be aligned with the mechanical axis of the source package) of a minimum, at 20 mA current, of about 500 to about 5000 mcd (typical, about 700 to about 7000 mcd); operate at a forward current of about 20 mA to about 50 mA; emit with a dominant wavelength (CIE Chromaticity Diagram) of about 530 nm to about 680 nm; and have a viewing angle 2□½ (where □½ is the off-axis angle where the luminous intensity is one half the peak intensity) of about 5 degrees to about 25 degrees.

The LED source preferably has a well-defined light pattern, such as a cone of directed, low level light which eliminates the need for reflectors or other separate optical components to direct the light where desired is preferably mounted on or within the mirror case 12, or the mirror support 10 and positioned to direct light at the desired area of the vehicle interior, e.g., the instrument panel or console area, and generates low heat while having an extremely long and durable life which typically will outlast the operational life of the rearview mirror assembly and the vehicle on which it is mounted. If mounted on or within mirror support 10, the LED source may be fixed to illuminate a predetermined location within the interior cabin. The small size of the light emitting source, which preferably has a cross-sectional area less than about 4 cm2, and more preferably less than about 1 cm2, allows it to be easily positioned within the confined spaces of the rearview mirror assembly or mirror support. Because of their durability, these sources require little or no maintenance or repair thereby eliminating concern for access after the mirror assembly or mirror support is manufactured. The HLMT-DL00 diode from Hewlett Packard is available with a generally circular area of about 0.3 cm2 and requires only 20 mA current for operation and provides a 23□ cone of directed light with a dominant amber color of a typical dominant wavelength of approximately 590 nm, and a typical intensity of 1500 millicandela (mcd). Preferably, a resistor of about 450 ohms to about 500 ohms, typically about 470 ohms, is connected in series with the preferred LED, with the ignition/battery voltage of the vehicle being directly applied across their series connection. Other colors such as green, orange, yellow, red and blue may be also be obtained depending on the elemental composition of the diode or other light emitting source selected. Separate filters are not required to produce the colors. The low level illumination provided by the light emitting diode preferably has a maximum of about 0.2 to 0.4 lux at a distance of between about 22 and 26 inches at current of about 20 mA to about 50 mA at about 2.0 volts to about 5.0 volts. A resistor is preferably connected in series with the light emitting diode to act as a voltage divider so as to reduce the ignition voltage of the vehicle, which is in the range of 9 to 16 volts (nominally 12 volts), to the desired operating voltage of the light source (which typically is in the range of about 1 volt to about 5 volts, with about 2 volts to about 4.5 volts most typical for the preferred solid-state, very high intensity LED sources). The resistor preferably has a resistance of less than about 1500 ohms and greater than about 100 ohms; more preferably less than about 1000 ohms and greater than about 200 ohms.

Alternately, white light LEDs can also be used as non-incandescent light sources in the manner described in U.S. Pat. No. 5,671,996. Also, such as is disclosed in U.S. Pat. No. 5,671,996 above, a plurality of LEDs such as of red emitting, amber emitting, red-amber emitting or white light emitting diodes can be included on the combined rearview mirror support and information display assembly (and/or on the rearview mirror attached thereto) to provide interior lighting, such as map lighting, for the vehicle. For example, a plurality of at least two (preferably at least four) white light LEDs (or another color such as red, amber or red-amber) can be provided on or in a bottom surface of the rearview mirror case and adapted to shine light onto occupants' lap areas in the front seat area for map reading, interior lighting, and the like. User operable switches to allow occupant activation of such combined rearview mirror support and information display assembly mounted and/or rearview mirror mounted LED interior lights can be provided on the combined assembly, the mirror case or elsewhere, within the vehicle interior cabin.

Figure 15:
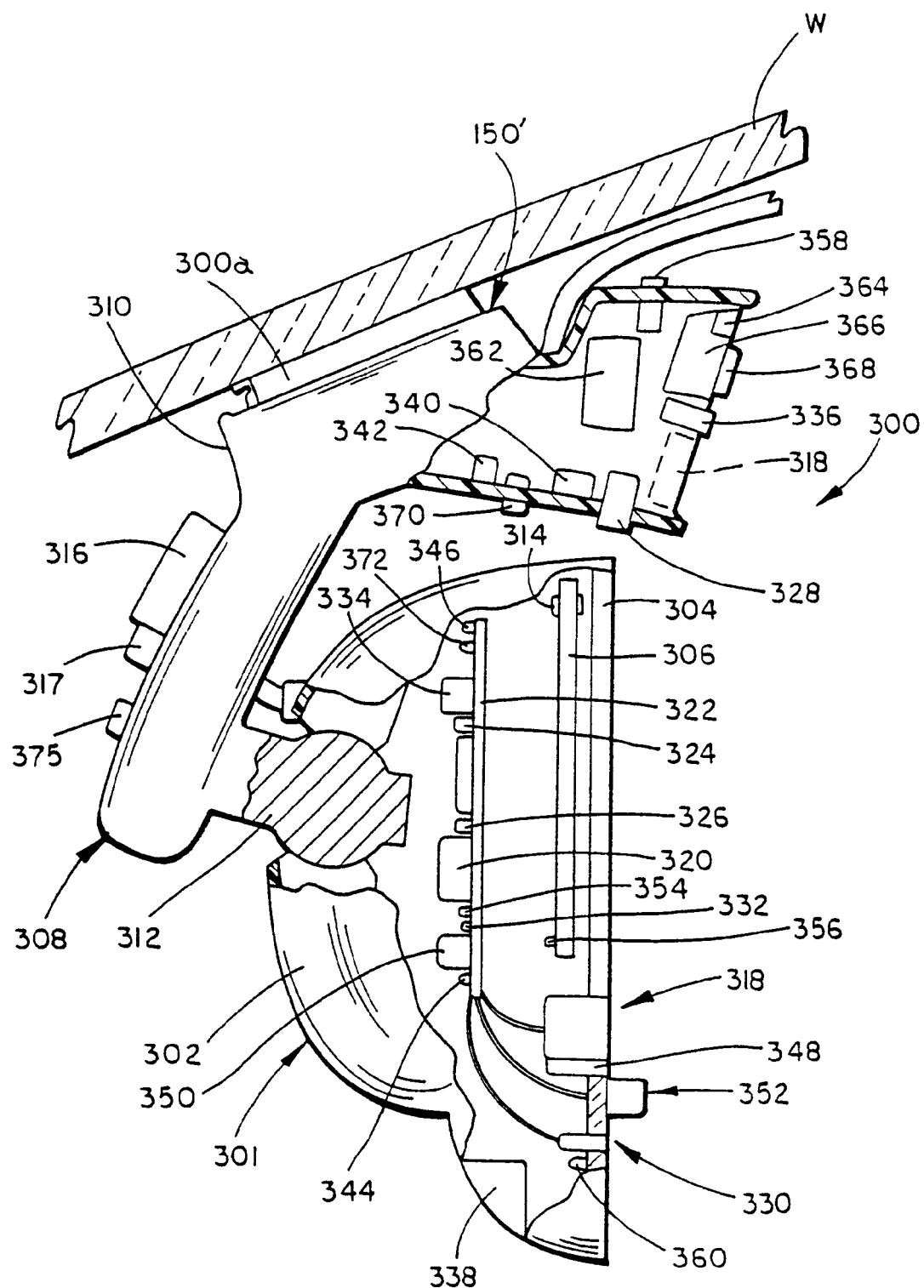
FIG. 15 is a side elevation shown partially in section of a third embodiment of the rearview mirror support and information display assembly for vehicles which also incorporates a rearview mirror assembly having various electrical and/or electronic components as well as an information display therein.

Referring to FIG. 15, a third embodiment 300 of the invention includes rearview mirror assembly 301 having a mirror case 302, with a bezel 304 and reflector 306 supported therein, and a rearview mirror support and information display assembly 308, both of which are mounted to a window button 300a adhered to windshield W by a mounting assembly 150' substantially similar to that in assembly 10. Rearview mirror support and information display assembly 308 includes a support stay 310, including ball pivot member 312 for mounting rearview mirror assembly 301 to windshield button 300a with mounting assembly 150'. As will be more fully described below, assembly 300 may also include one or more of a plurality of electrical and/or electronic components mounted in or on any one of the components of mirror assembly 301, including case 302, bezel 304, reflector 306, support and display assembly 308, windshield button 300a and/or circuit board within assembly 308. For example, the present invention may include those assemblies described in U.S. patent application Ser. No. 08/799,734, entitled "Vehicle Blind Spot Detection and Display System", invented by Schofield et al. and filed Feb. 12, 1997, now U.S. Pat. No. 5,786,772, the disclosure of which is hereby incorporated herein by reference. A blind spot detection indicator 314 may be positioned in reflector 306. Furthermore, mirror assembly 301 may include a variety of vehicle accessories such as a rain sensor 316 mounted, for example, on assembly 308. Rain sensor functionality, as is commonly known in the automotive art, is provided in association with an interior rearview mirror assembly. Such association includes utilizing an element of the rearview mirror assembly (such as a plastic housing attached, for example, to the mirror channel mount that conventionally attaches the mirror assembly to a windshield button) to cover a windshield-contacting rain sensor (such as is described in U.S. Pat. No. 4,973,844 entitled "Vehicular Moisture Sensor and Mounting Apparatus Therefor", the disclosure of which is hereby incorporated herein by reference), or it may include a non-windshield-contacting rain sensor (such as is described in PCT International Application PCT/US94/05093 entitled "Multi-Function Light Sensor For Vehicle", published as WO 94/27262 on Nov. 24, 1994, the disclosure of which is hereby incorporated by reference herein). Also, a mirror mounted video camera can be used to visually detect the presence of moisture on the windshield, and actuate the windshield wipers accordingly, such as is described in co-pending U.S. patent application Ser. No. 08/621,863, filed Mar. 25, 1996, entitled VEHICLE HEADLIGHT CONTROL USING WAGING SENSOR, by Schofield et al., now U.S. Pat. No. 5,796,094, which is hereby incorporated by reference herein.

Rearview mirror assembly 301 or assembly 308 may also include one or more displays 318 which may be mounted on one or more of the assembly components as noted above, including as a display in assembly 308 above rearview mirror assembly 301 as an option (FIG. 15). In like manner to the displays in assemblies 10, 200 above, displays 318 may perform a single display function or multiple display functions, such as providing indication of an additional vehicle function, for example a compass mirror display function, a temperature display function, status of inflation of tires display function, a passenger air bag disable display function, an automatic rain sensor operation display function, telephone dial information display function, highway status information display function, blind spot indicator display function, or the like. Such display may be an alpha-numerical display or a multi-pixel display, and may be fixed or scrolling. Such an automatic rain sensor operation display function may include a display function related to rain sensor 316 for both a windshield-contacting and a non-windshield-contacting rain sensor, including, for example, where the circuitry to control rain sensor 316 and other electrical and/or electronic devices, including electrochromic dimming circuitry 320 of a variable reflectance electrochromic mirror, bulb holders, and switches, are commonly housed in or on rearview mirror assembly 301 and wholly or partially share components on common circuit board 322. Circuit board 322 may be a carrier member incorporating a circuit member of the type described in copending, commonly-assigned U.S. patent application Ser. No. 08/918,772, filed Aug. 25, 1997, by DeLine et al., now U.S. Pat. No. 6,124,886, the disclosure of which is hereby incorporated by reference herein. Display 318 may alternate between display functions by a display toggle which may be manually operated, time-shared, voice-actuated, or under the control of some other sensed function, such as a change in direction of the vehicle or the like. Should a rain sensor control circuitry 317 be associated with, incorporated in, or coupled to assembly 300, rain sensor control circuitry 317, in addition to providing automatic or semi-automatic control over operation of the windshield wipers (on the front and/or rear windshield of the vehicle), may be adapted to control the defogger function to defog condensed vapor on an inner cabin surface of a vehicle glazing (such as the inside surface of the front windshield, such as by operating a blower fan, heater function, air conditioning function, or the like), or rain sensor control circuitry 317 may be coupled to a sunroof to close the sunroof or any other movable glazing should rain conditions be detected.

As stated above, it may be advantageous for the rain sensor control circuitry 317 (or any other feature such as a head-lamp controller, a remote keyless entry receiver, a cellular phone including its microphone, a vehicle status indicator and the like) to share components and circuitry with other components and/or control circuitry, for example with an electrochromic mirror function control circuitry and an electrochromic mirror assembly itself. Also, a convenient way to mount a non-windshield-contacting rain sensor such as described in PCT Application No. PCT/US904/05093 referenced above, is by attachment, such as by snap-on attachment, as a module to the mirror channel mount or, in this case, mirror stay 310, such as is described in U.S. Pat. No. 5,576,687 entitled "Mirror Support Bracket," invented by R. Hook et al. and issued Nov. 19, 1996, the disclosure of which is hereby incorporated by reference herein. Assembly 308 and/or windshield button may optionally be specially adapted to accommodate a non-windshield-mounting rain sensor module. Such mounting as a module is readily serviceable and attachable to a wide variety of lighted and unlighted interior mirror assemblies (both electrochromic and non-electrochromic such as prismatic, manually adjusted mirror assemblies), and can help ensure appropriate alignment of the non-windshield-mounted variety of rain sensor to the vehicle windshield insofar that the module attached to the mirror mount or assembly 308 remains fixed whereas the mirror itself, which attaches to assembly 308 via a single or double ball joint support, is movable so that the driver can adjust the field of view. Also, should smoke from cigarettes and the like be a potential source of interference to the operation of the non-windshield-contacting rain sensor, then a mirror-attached housing can be used to shroud the rain sensor unit and shield it from smoke (and other debris). Optionally, such ability to detect presence of cigarette smoke can be used to enforce a non-smoking ban in vehicles, such as is commonly requested by rental car fleet operators. Also, when a rain sensor (contacting or non-contacting) is used to activate the wiper on the rear window (rear blacklight) of the vehicle, the rain sensor may be alternatively packaged and mounted with the CHMSL (center high mounted stop light) stop light assembly commonly mounted on the rear window glass or close to it. Mounting of the rain sensor with the CHMSL stop light can be aesthetically appealing and allow sharing of components/wiring/circuitry.

As mentioned above, the concepts of this present invention can be used with interior rearview mirrors equipped with a variety of features and accessories, such as a home access transmitter 324, a high/low (or daylight running beam/low) headlamp controller 326, a hands-free phone attachment 328, a video device 330, such as a video camera, for internal cabin surveillance and/or video telephone function, a remote keyless entry receiver 332, a compass 334, a seat occupancy detection 336, one or more map reading lights 338, a trip computer 340, an intrusion detector 342, and the like. Display 318 may also include a compass/temperature and/or clock display, fuel level display, and other vehicle status and other information displays. Again, such features can share components and circuitry with, for example, electrochromic mirror circuitry 320 and other components of assembly 300 so that provision of these extra features is economical.

Placement of video device 330 (FIG. 15) either at, within, or on the interior rearview mirror assembly (including within or on a module attached to a mirror structure such as assembly 308 which attaches to the windshield button) has numerous advantages. In the illustrated embodiment, video device 330 is located in case 302 and positioned below reflective element 306. For example, locating video device 330 in rearview mirror assembly 300 provides the video device 330 with an excellent field of view of the driver and of the interior cabin in general since the rearview mirror is centrally and high mounted. Also, mirror assembly 300 is at a defined distance from the driver so that focus of the video device is facilitated. Also, if video device 330 is placed on a movable portion of mirror assembly 300, for example, on mirror case 302, the normal alignment of mirror reflector 306 relative to the driver's field of vision rearward can be used to readily align the video device 330 to view the head of the driver. Since the video device is fixed to the mirror case, normal alignment by the driver of the reflector element in the case to properly see out the rear window of the vehicle simultaneously aligns the video device, i.e., camera, to view the driver's head, of great benefit in video conferencing and the like. Since many interior rearview mirrors, such as lighted mirrors, are electrically serviced, placement of video device 330 at, within, or on the rearview mirror assembly can be conventionally and economically realized, with common sharing of components and circuitry by, for example, compass 334 (which may include a flux gate sensor, a magneto-resistive sensor, a magneto-inductive sensor, or a magneto-capacitive sensor), a bulb holder for light 338 or bulbs, switches, an electrical distribution busbar such as a circuit member as shown in U.S. patent application Ser. No. 08/918,772, mentioned above, a display, such as display 318, and electrochromic dimming mirror circuitry 320. Although the driver is likely the principal target and beneficiary of video device 330, the lens of video device 330 can be mechanically or electrically (i.e., via a joystick) adjusted to view other portions/occupants of the vehicle cabin interior. Alternately, the video device's field of view can be voice responsive so that whoever is speaking in the vehicle is image captured. In this regard, the joystick controller that adjusts the position of the reflector on the outside rearview mirrors can, optionally, be used to adjust the video device 330 field of view as well. Preferably, video device 330 is fixedly mounted in the mirror case 302 and connected to a circuit member such as 322 with the lens of video device 330 positioned for viewing through bezel 304. Alternately, video device 330 may be mounted in assembly 308 above the mirror housing (but mechanically attached thereto so the camera field of vision moves in tandem with movement of the mirror housing). Alternately, video device 330 may be mounted in assembly 308 attached to the mounting assembly 150' or on windshield button 300a (with the camera lens facing rearward in the vehicle and generally facing the driver). Video device 330 may comprise a CCD camera or a CMOS based video microchip camera (which may be an active pixel sensor CMOS array or a passive pixel sensor CMOS array), such as is described in commonly owned, co-pending, European Patent Application EP 0 788 947, Application Number 97105447.3, filed Feb. 25, 1994, published Aug. 13, 1997, the disclosure of which is hereby incorporated by reference herein. For operation at night, the internal cabin of the vehicle may optionally be illuminated with non-visible radiation, such as near-infrared radiation, with video device 330 being responsive to the near-infrared radiation so that a video telephone call can be conducted even when the interior cabin is dark to visible light, such as at night.

Also, video device 330, which is preferably mounted at, within, or on the inner rearview mirror assembly (such as within the mirror case 302 or in assembly 308), may be adapted to capture an image of the face of a potential driver and then, using appropriate image recognition software, decide whether the driver is authorized to operate the vehicle and, only then, enable the ignition system to allow the motor of the vehicle be started. Use of such a mirror-mounted video device (or a digital still camera) enhances vehicle security and reduces theft. Further, video device 330 may be adapted to monitor the driver while driving and, by detection of head droop, eye closure, eye pupil change, or the like, determine whether the driver is becoming drowsy/falling asleep, and then to activate a warning to the driver to stay alert/wake up.

It is beneficial to use a microprocessor to control multiple functions within the interior mirror assembly and/or within other areas of the vehicle (such as the header console area), and such as is described in Irish Patent Application Ser. No. 970014, entitled "A Vehicle Rearview Mirror and A Vehicle Control System Incorporating Such Mirror," filed Jan. 9, 1997, published as International PCT Application No. WO 98/30415, on Jul. 16, 1998, the disclosure of which is hereby incorporated by reference herein. Such microprocessor can, for example, control the electrochromic dimming function, a compass direction display, an external temperature display, and the like. Some or all of the electrical/electronic components can be mounted or included on the circuit board within support assembly 308 to lighten and improve the vibration response of the supported rearview mirror. For example, a user actuatable switch can be provided that at one push turns on a compass/temperature display, on second push changes the temperature display to metric units (i.e., to degrees Celsius), on third push changes to Imperial units (i.e., degrees Fahrenheit) and on fourth push turns off the compass/temperature display, with the microprocessor controlling the logic of the display. Alternately, a single switch actuation turns on the display in Imperial units, the second actuation changes it to metric units, and third actuation turns the display off. Further, the displays and functions described herein can find utility also on outside rearview mirrors. For example, a transducer 344 which receives and/or transmits information to a component of an intelligent highway system (such as is known in the automotive art) can be incorporated into an interior and/or outside rearview mirror assembly and, preferably, mounted to common circuit board 322. Thus, for example, a transmitter/receiver 346 for automatic toll booth function could be mounted at/within/on an outside sideview mirror assembly. Preferably, transmitter/receiver 346 is also mounted to common circuit board 322. A digital display of the toll booth transaction can be displayed by display 318. Optionally, a micro printer 348 may be incorporated within rearview mirror assembly 300 which can print a receipt or record of the transaction. In the illustrated embodiment, printer 348 is shown mounted in case 302, but it should be understood, as with most of the other components, that it can be mounted in a variety of locations on mirror assembly 300, such as in assembly 308. Similarly, for safety and security on the highways, GPS information, state of traffic information, weather information, telephone number information, and the like may be displayed and transmitted/received via transducers located at, within, or on an interior rearview mirror assembly, including assembly 308, and/or an outside sideview mirror assembly.

In like manner, a microprocessor as described above can be used to control an imaging sensor 374 (FIG. 15), such as a CMOS or CCD based micro-chip camera array, which can be incorporated within rearview mirror assembly 300, or more preferably, mirror support assembly 308, to face forward and sense oncoming headlights or other taillights and adjust the headlights of the controlled vehicle in response to such sensing as described in copending, commonly assigned U.S. patent application Ser. No. 08/621,863, filed Mar. 25, 1996, by Schofield et al., entitled VEHICLE HEADLIGHT CONTROL USING IMAGING SENSOR, now U.S. Pat. No. 5,796,094, the disclosure of which was incorporated by reference herein as noted above. The imaging sensor can divide the scene forward of the controlled vehicle into spatially separated sensing regions, and provide for different exposure periods, while sensing light or the absence of light in each region.

Also, interior rearview mirror assembly 300 may optionally include an Internet Interface circuit 350 to provide a link to the Worldwide Web. Circuit 350 may be coupled to a modem/cellular phone or cell phone control panel 352 mounted within the vehicle, and preferably, mounted at, within or on the interior rearview mirror assembly 300, including assembly 308. Thus, the driver or passenger can interact with other road users, can receive/transmit messages including E-mail, can receive weather and status of highway traffic/conditions, and the like, via a mirror located interface to the INTERNET, and display messages therefrom at the mirror assembly such as at the support mounted display.

Further, a trainable garage door opener 354, including a universal garage door opener such as is available from Prince Corporation, Holland, Mich. under the tradename HOMELINK™, or a transmitter 356 for a universal home access system which replaces the switch in a household garage that opens/closes the garage door with a smart switch that is programmable to a household specific code that is of the rolling code type, such as is available from TRW Automotive, Farmington Hills, Mich. under the tradename KWIKLINK™, may be mounted at, within, or on interior mirror assembly 300 (or, if desired, an outside sideview mirror). Switches to operate such devices (typically up to three separate push type switches, each for a different garage door/security gate/household door) can be mounted on mirror assembly 300, preferably user actuatable from the front face of the mirror case 302 or assembly 308. Preferably, the universal garage door opener HOMELINK™ unit or the universal home access KWIKLINK™ unit is mounted at, within, or on interior rearview mirror assembly 300. Optionally, such a unit could be mounted at, within or on an outside sideview mirror assembly.

The KWIKLINK™ Universal Home Access System (which operates on a rolling code, such as is commonly known in the home/vehicle security art) comprises a vehicle mounted transmitter and a receiver located in the garage. The KWIKLINK™ system is a low-current device that can be, optionally, operated off a battery source, such as a long life lithium battery. It is also compact and lightweight as executed on a single- or double-sided printed circuit board. The KWIKLINK™ printed circuit board can be mounted within the mirror housing (optionally adhered to a shock absorber comprising a double-sticky tape anti-scatter layer on the rear of the reflector element (prismatic or electrochromic) such as is described in U.S. Pat. No. 5,572,354 entitled "Rear Mirror Assembly", invented by J. Desmond et al. and issued Nov. 5, 1996, the disclosure of which is hereby incorporated by reference herein or may be accommodated within and with the detachable module attached to the mirror stay 310 or to the mirror button 300a. Mounting the KWIKLINK™ unit in a detachable module has advantages, particularly for aftermarket supply where a battery operated KWIKLINK™ unit can be supplied within an assembly such as 308 (with the necessary user actuatable button or buttons mounted on the assembly and with the battery being readily serviceable either by access through a trap door and/or by detaching the assembly from the windshield). By supplying a battery-operated, stand-alone, snap-on, detachable KWIKLINK™ mirror mount pod, the KWIKLINK™ home access system can be readily and economically provided to a broad range of mirrors including non-electrical mirrors such as base prismatic mirrors, and electrical mirrors such as unlighted and lighted mirrors (including prismatic and electrochromic types) and electro-optic mirrors, such as electrochromic mirrors. Further, a solar panel 358 may be installed on assembly 308 for receiving sunlight to recharge the battery. In a similar fashion, a security monitor such as a pyroelectric intrusion detector as disclosed in copending U.S. patent application Ser. No. 08/720,237, filed Sep. 26, 1996, the disclosure of which is hereby incorporated by reference herein, remote keyless entry receiver, and compass, as described previously, and the like, may be readily installed in mirror case 302 or assembly 308.

Assembly 300 may further include a cellular phone 360 incorporated into interior mirror assembly 301 with its antenna, optionally, incorporated into the outside sideview mirror assembly or into inside rearview mirror assembly 300. Such mounting within the mirror assemblies has several advantages including that of largely hiding the cellular phone and antenna from ready view by a potential thief. Furthermore, seat occupancy detector 336 may be coupled to an air bag deployment/disable monitor, which can be located at, within or on the interior rearview mirror assembly 300. Seat occupancy detector 336 may comprise a video microchip or CCD camera seat occupancy detector, an ultrasonic detector, a pyroelectric detector, or anyone or more of their combination. Moreover, where more than one rearview mirror is being controlled or operated, or when several vehicle accessories are linked to, for example, an electrochromic interior or outside mirror, interconnections can be multiplexed, as is commonly known in the automotive art. Moreover, where it is desired to display external outdoor temperature within the interior cabin of the vehicle, a temperature sensor (such as a thermocouple or thermistor) can be mounted at, within or on an outside sideview mirror assembly (for example, it can protrude into the slipstream below the lower portion of the sideview mirror housing in a manner that is aesthetically and styling acceptable to the automakers and to the consumer) and with the temperature sensor output connected, directly or by multiplexing to display 318 or a separate display (such as a vacuum fluorescent display) located in the interior cabin of the vehicle.

Preferably, the external temperature display is located at, within or on the interior rearview mirror assembly, optionally in combination with another display function such as a compass display (see U.S. patent application Ser. No. 08/799,734, entitled "Vehicle Blind Spot Detection System" invented by K. Schofield et al., and filed Feb. 12, 1997, now U.S. Pat. No. 5,786,772), or as a stand-alone pod such as assembly 308 as a module combined with a mirror support member. Most preferably, the interior and outside mirror assemblies are supplied by the same supplier, using just-in-time sequencing methods, such as is commonly known in the automotive supply art and as is commonly used such as for supply of seats to vehicles. Just-in-time and/or sequencing techniques can be used to supply a specific option (for example, the option of configuring an external temperature display with a base prismatic interior mirror, or with a base electrochromic interior mirror, or with a compass prismatic interior mirror, or with a compass electrochromic interior mirror) for an individual vehicle as it passes down the vehicle assembly line. Thus, the automaker can offer a wide array of options to a consumer from an option menu. Should a specific customer select an external temperature display for a particular vehicle due to be manufactured by an automaker at a particular location on a specific day/hour, then the mirror system supplier sends to the vehicle assembly plant, in-sequence and/or just-in-time, a set of an interior rearview mirror assembly and at least one outside sideview mirror assembly for that particular vehicle being produced that day on the assembly line, and with the outside sideview mirror equipped with an external temperature sensor and with the interior rearview mirror assembly or assembly 308 equipped with an external temperature display. Such just-in-time, in-sequence supply (which can be used for the incorporation of the various added features recited herein) is facilitated when the vehicle utilized a car area network such as is described in Irish Patent Application No. 970014 entitled "A Vehicle Rearview Mirror and A Vehicle Control System Incorporating Such Mirror", application date Jan. 9, 1997, published as International PCT Application No. 98/30415, on Jul. 16, 1998, the disclosure of which is hereby incorporated by reference herein, or when multiplexing is used, such as is disclosed in U.S. patent application Ser. No. 08/679,681 entitled "Vehicle Mirror Digital Network and Dynamically Interactive Mirror System", invented by O'Farrell et al., and filed Jul. 11, 1996, now U.S. Pat. No. 5,798,575, the disclosure of which is hereby incorporated by reference herein. Also, given that an interior electrochromic mirror can optionally be equipped with a myriad of features (such as map lights, reverse inhibit line, headlamp activation, external temperature display, remote keyless entry control, seat occupancy detector such as by ultrasonic, pyroelectric or infrared detection, and the like), it is useful to equip such assemblies with a standard connector (for example, a 10-pin parallel connector) such as electrical connections for receiving a plug connector 28 as described above, so that a common standard wiring harness can be provided across an automaker's entire product range. Naturally, multiplexing within the vehicle can help alleviate the need for more pins on such a connector, or allow a given pin or set of pins control more than one function.

The concepts of this present invention can be further utilized in added feature interior rearview mirror assemblies including those that include a loudspeaker (such as for a vehicle audio system, radio or the like, or for a cellular phone including a video cellular phone). Such loudspeaker may be a high frequency speaker that is mounted at, within, or on the interior rearview mirror assembly 300 (such as within the mirror case 302 or assembly 308 and as shown as loudspeaker 362 in FIG. 47) and with its audio output, preferably, directed towards the front windshield of the vehicle so that the windshield itself at least partially reflects the audio output of the speaker (that preferably is a tweeter speaker, more preferably is a compact speaker such as about 1"×1"×1" in dimensions or smaller, and most preferably utilizes a neodymium magnet core) back into the interior cabin of the vehicle. Interior rearview mirror assembly 300 may also include a microphone 364 and a digital (or a conventional magnetic tape) recorder 366 with its associated circuitry 368, which can be used by vehicle occupants to record messages and the like. Display 318 may be adapted to receive paging information from a pager 370, which may be incorporated in interior rearview mirror assembly 300, for example, in assembly 308, and that displays messages to the driver (preferably via a scrolling display) or to other occupants. Interior rearview mirror assembly 300 may include a digital storage device 372, which stores information such as phone numbers, message reminders, calendar information, and the like, that can, automatically or on demand, display information to the driver.

The concepts of this present invention can be utilized in a variety of prismatic and electrochromic compass mirrors (both lighted and unlighted mirrors) that display directional information based upon compass sensor 334 (which may comprise a flux gate sensor, a magneto-responsive sensor, such as an magneto-resistive sensor, magneto-inductive sensor, or a magneto-capacitive sensor, a hall affect sensor, or an equivalent compass sensor). Alternatively, directional information obtained from a geographic positioning system such as a Global Positioning System (GPS) as is disclosed in co-pending U.S. patent application Ser. No. 08/569,851, filed Dec. 8, 1995, entitled VEHICLE GLOBAL POSITIONING SYSTEM, by O'Farrell et al now U.S. Pat. No. 5,971,552, the disclosure of which is hereby incorporated by reference herein, could be used to provide the compass direction signal for a minor mounted display, For instance, a mirror of this invention could utilize a variable reflective element with an electrochromic solid polymer matrix such as described in co-pending, commonly assigned U.S. patent application Ser. No. 08/824,501, filed on Mar. 27, 1997, now U.S. Pat. No. 5,910,854, the disclosure of which is hereby incorporated by reference. Compass sensor 334 may be mounted anywhere in the vehicle and with its directional signal fed to a digital display, for example display 318, (such as a liquid crystal display, a vacuum fluorescent display, or light emitting diode display, an electro luminescent display, or the like) that is mounted at/in/on interior rearview mirror assembly 300. In another example, compass sensor 334 may also be mounted in the dashboard or in the header region close to the roof of the vehicle. Compass sensor 334 may also be mounted at interior rearview mirror assembly 300 by placement within assembly 308 that fixedly mounts sensor 334 to windshield button mount 300a, and as is described in U.S. Pat. No. 5,530,240 to Larson et al. and in U.S. Pat. No. 5,576,687 entitled "Mirror Support Bracket", referred to above. In the illustrated embodiment, however, compass sensor 334 is mounted within case 302 of interior mirror assembly 300 along with its associated circuitry and any optional map lights (338) and the like. Mounting of compass sensor 334 within the housing of the interior mirror assembly (as an alternate to placing the compass within assembly 308, which may be fixedly attached to mirror support that typically attaches to the front windshield and bracket) has some advantages. For example, by mounting compass sensor 334 within case 302, additional wiring in the wire harness, which would be required to couple the compass directional signals from sensor 334 in assembly 308 to display 318, which is preferably mounted within case 302 or assembly 308. Such location of compass sensor 334 within or at case 302 or assembly 308 of mirror assembly 300 also means that there is no external evidence of the presence of the sensor, and, thus, aesthetics are potentially enhanced. Also, such placement of sensor 334 within case 302 of mirror assembly 300 (such as schematically shown in FIG. 15) is suitable for header mounted mirrors such as assembly 200 above or as shown in U.S. Pat. No. 5,615,857, the reference to which herein incorporated by reference in its entirety. Most preferably, sensor 334 is in the form of an integrated circuit chip mount (or similar printed circuit board insertable form) so that compass sensor 334 can be placed on circuit board 322 as are preferably the other electrical/electronic components within case 302 of interior mirror assembly 300. By having compass sensor 334 housed within the rearview mirror assembly 300 along with it wholly or partially sharing components, manufacturing and packaging economies are realized. Such housing of compass sensor 334 on common printed circuit board or circuit member 322 along with the other electrical and/or electronic components, for example, any one or more electrical or electronic components, described in reference to this and earlier embodiments, including any electrochromic dimming circuitry to automatically dim reflectivity when glare conditions are detected by light sensors, displays, any bulb holders/switches, microprocessors, and their like, further enhances the manufacturing and packaging economies. Since case 302 of mirror assembly 300 is adjustable by the driver to assist his or her needs, a compass sensor 334 within case 302 may have a different orientation from one driver to another, which may result in a relatively minor inaccuracy in directional information. These inaccuracies, however, are typically unnoticeable and, moreover, may be mitigated by using stabilization means and algorithms, including fuzzy logic, and/or using deviation compensatory means, as are known in the compass art.

Further, where compass and compass/temperature displays such as shown in pending U.S. patent application Ser. No. 08/799,734, entitled "Vehicle Blind Spot Detection and Display System", invented by Schofield et al. and filed Feb. 12, 1997, now U.S. Pat. No. 5,786,772, are used, the front plate over the display 318 may be angled relative to the driver's line of sight (between about 2° to 10° and, most preferably, between about 4° to 8° relative to line of sight), so that any headlight glare incident thereon is reflected away from the driver.

Figure 16:
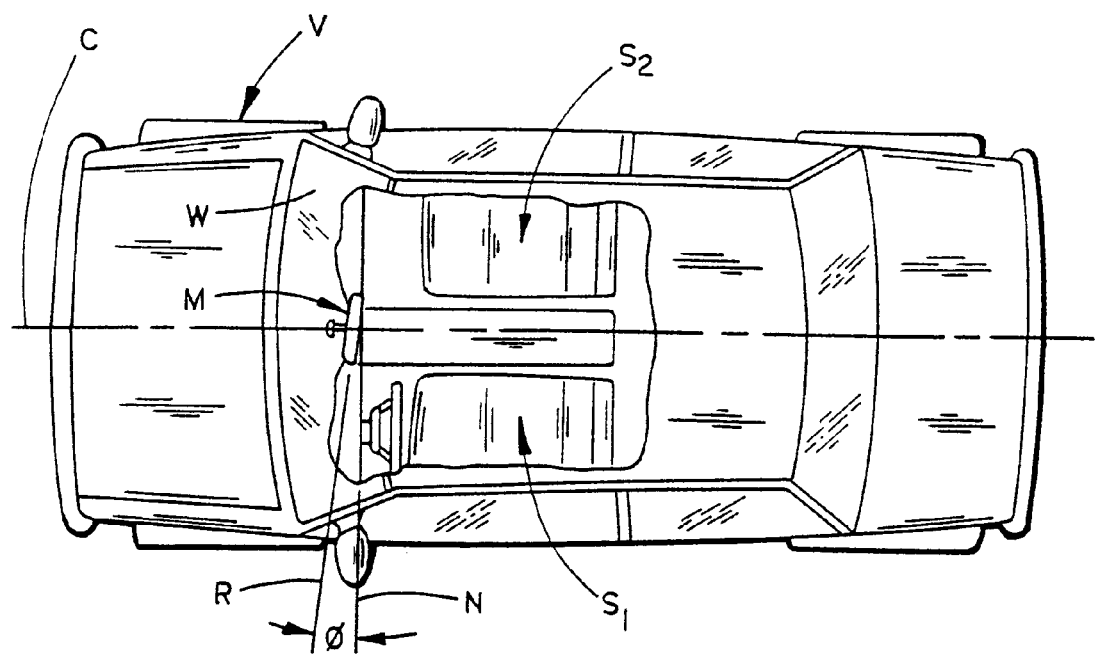
FIG. 16 is a schematic plan view of a vehicle incorporating an interior rearview mirror assembly positioned at an angle to the center line of the vehicle for viewing by the driver.
Figure 17:
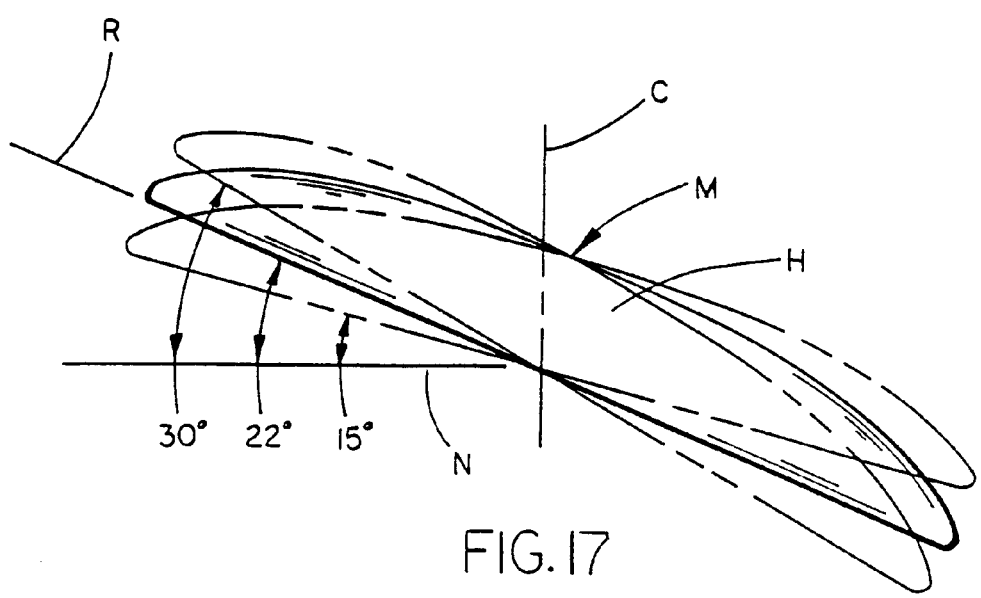
FIG. 17 is a schematic plan view of an interior rearview mirror assembly showing the typical range of adjustment angles for viewing by various size vehicle drivers.

Referring to FIGS. 16 and 17, a vehicle V having a center line C is shown including an interior rearview mirror M mounted on the interior surface of the front windshield W. When a driver is positioned in the driver's seat S1 to operate the vehicle, mirror M is typically angled or canted to the left (for a left-hand drive vehicle) such that the plane R of the reflective mirror element housed in housing H of the mirror assembly M lies at an angle φ to a plane N which is perpendicular to center line C. As shown in FIG. 17, the typical rearview mirror adjustment for various sizes of vehicles drivers is such that angle φ is within the range of between about 15° and 30° and typically at a maximum of about 22° for most drivers (although angle φ can be greater than 30° or less than 15° but is greater than 0°). In the event a rearview mirror assembly, such as that shown at M, includes an information display, regardless of whether such display reads out through the reflective mirror element or through a portion of the case or housing H surrounding the reflective mirror element, the information will be displayed and emitted obliquely to the forward view of a passenger sitting in the right-hand, forward seat S2 of the vehicle. As angle φ of mirror plane R of rearview mirror assembly M increases from 15° to 22° to 30°, or even larger, for shorter drivers who move their driver's seat S1 forwardly so as to properly reach the steering wheel and engage the operator's pedals on the floor, such information display becomes more and more difficult to see for a passenger seated in passenger seat S2. Especially for information read outs relating to the operation and enablement of the supplemental occupant restraint systems or air bags on the passenger side, known as the Passenger Side Inflatable Restraint or PSR (referenced above in connection with FIGS. 2 and 4), the lack of information available to the passenger can be important to the passenger's awareness of the operation or disablement of the passenger side air bag and, thus, preventing injuries to the passenger in seat S2.

As shown in FIGS. 18-20, a fourth embodiment of the present invention incorporates an interior rearview mirror assembly 400 which overcomes the inability for a passenger in the passenger side seat S2 to read critical information presented in information displays on the rearview mirror assembly as the rearview mirror is canted more and more toward the driver, and especially for smaller size drivers. Rearview mirror assembly 400 includes a reflective mirror element 402 which may be of varying types including manually operated, prismatic day/night mirrors, or electrically operated compass mirrors, or electrically operated mirrors including maps/reading lights, or electrically operated automatically dimming mirrors (such as those using electrochromic mirror elements), or memory mirrors such as are described above in connection with embodiment 10. Mirror element 402 has a generally planar front surface and is supported and housed in a rearview mirror housing or case 404 which may be molded therearound from a resinous polymeric material such as polypropylene, nylon, or ABS plastic, or molded for receipt of the mirror element 402 therein after manufacture. Mirror housing 404 includes a back 406, peripheral sides 408, and a peripheral front edge 410 which outlines the periphery of the reflective mirror 402 and may be formed in one piece with housing 404 such as is shown in FIGS. 18-20, or may be formed as a separately mounted bezel for attachment to the remainder of mirror housing 404 after insertion of reflective element 402. At the lower edge of mirror element 402, and at or below peripheral edge 410 at the "chin" of the mirror assembly is a depending or bottom housing portion 412 including an angled or canted information display housing portion 414 which extends or faces more toward the passenger side end of the rearview mirror assembly than the plane R of the front surface of mirror element 402, and has an information display element 424 lying in plane P (FIG. 20) which extends at an acute angle β to plane R of front mirror surface 402 as measured from the passenger side end of housing portion 414. Housing portion 414 includes a top surface 416, bottom surface 418, end surface 420 and front surface 422. Front surface 422 includes information display 424 having a front surface lying in plane P and which is similar to information display 130 described above in conjunction with embodiment 10. In the specific embodiment shown, display 424 is a PSIR indicator advising passengers within the vehicle as to the operational status of the passenger side air bag such as when the air bag is enabled ("on") or disabled/suppressed ("off").

As shown in FIG. 20, display housing portion 414 is adapted to angle away from plane R of mirror element 402 and toward the passenger in the front passenger seat S2 at an angle β which is generally matched to, or is preferably greater than, the typical angle at which rearview mirror assembly 400 will be angled or canted for use by the driver in driver seat S1. For example, if the angle φ selected by the driver for rearview mirror assembly 400 is 22° and plane P of display 424 is at the same angle β=22° as shown in FIG. 20, then plane P of display 424 will be positioned normal to the vehicle center line as in plane N in FIG. 16 when the assembly is mounted in the vehicle. Should a driver adjust the angle of the mirror assembly such that angle φ is at less than 22°, such as 15°, and when the plane P of display 424 is at β=22°, plane P of display 424 will, thus, be canted toward the passenger in seat S2. Such angle of cant will be equal to angle β minus angle φ. In the above example, where φ is 15°, and β is 22°, such angle will be +7° such that display 424 is canted by an angle of 7° beyond plane N which is normal to center line C toward a passenger in seat S2.

Figure 20B:
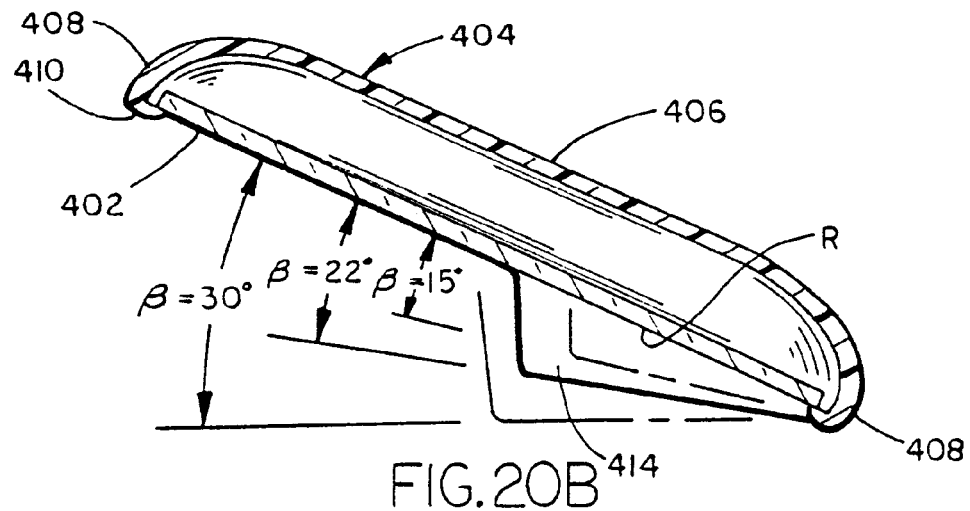
FIG. 20B is a sectional plan view of a rearview mirror assembly of FIG. 18 but showing the information display area extending at different angles toward the passenger side end.

As shown in FIG. 20B, housing portion 414 could also be positioned at a greater angle β such as 30°, or lesser angle β such as 15°, or smaller, but greater than 0°, depending on the dimensions of the vehicle in which mirror assembly 400 is adapted to be positioned and depending on the range and size of drivers who will drive that vehicle. When angle β=30°, and angle φ is 15°, plane P of display 424 will extend at +15° and be canted by an angle of 15° beyond plane N which is normal to center line C toward the passenger in seat S2. However, when angle β is less than angle φ, plane P of the display will be canted more toward the driver than the passenger. For example, when angle β=150 and angle φ is 22°, plane P of display 424 will extend at −7° and be canted toward the driver, but still face more toward the passenger in seat S2 than it would if β=0°.

Accordingly, as will be understood from FIGS. 20 and 20B, should the angle β at which plane P of display element 424 is positioned to equal to angle φ at which plane R of mirror is positioned by the driver, plane P of information display 424 will lie in plane N (FIG. 16) and face perpendicular or normal to the center line C of the vehicle. Should angle β be less than the angle φ of plane R of mirror 402, information display 424 will face less than normal to center line C but still face more toward a passenger in seat S2 than plane R of the mirror element. However, should angle β be greater than angle φ, plane P of information display 424 will be canted or angled more than normal to center line C and toward the passenger.

As shown in FIG. 20A, information display 424 may include various alpha-numeric displays or word, symbol or icon displays, such as that for the PSIR described above. Such indicia may be printed or formed on the front or rear surface of a display element 424 as described above in conjunction with element 130 in housing 20. As shown in FIG. 20A, element 424 is preferably backlit by a series of light emitting diodes (LEDs) 425 which are preferably mounted in a housing 426 secured to a pad 428 having apertures therethrough for passing light from LEDs 425 on the rear surface of element 424. A variety of backlighting sources could be used such as described in commonly-assigned U.S. Pat. No. 4,882,565 to William W. Gallmeyer, the disclosure of which is hereby incorporated by reference herein. Various light filters may also be used to produce a colored display, such as are also disclosed in U.S. Pat. No. 4,882,565. Each of LEDs 425 may be electrically connected through a wire harness or appropriate circuitry contained within rearview mirror assembly 400 and ultimately connected to the vehicle electrical system of the vehicle in which the mirror assembly is mounted. Preferably, nine LEDs would be used in the housing 426 to illuminate the PSIR indicia as shown in FIGS. 18 and 19. The indicia preferably are bright (such as white) letters, icons or markings on a dark background, and are preferably imprinted on the rear surface of element 424. Preferably, LEDs emitting green light, such as those available from Siemens Components Inc., Optel Electronics Division, of Cupertino, Calif., under Part No. P-LCC-2/LPT 672-N would be used to illuminate the words "passenger air bag" and the air bag symbol, while other LEDs emitting amber light, such as are available from Hewlett-Packard Corporation of Palo Alto, Calif. as high intensity LEDs under Part No. HPXR-5000 Series Automotive High Flux SMT, would be positioned behind the words "on" and "off". Thus, five green LEDs may be used to illuminate the words "passenger air bag" and the air bag symbol, and four amber LEDs would be provided for the words "on" and "off", two LEDs for each of those words. In the operation of the information display 424 during the day, only two of the amber LEDs would be operated by the control circuit so as to always illuminate either "on" or "off". However, at night, the five green LEDs would be operated, along with two of the amber LEDs to indicate the status of the PSIR. Alternately, blue emitting, red emitting or white light emitting LEDs can also be used. Further, non-incandescent light sources such as electroluminescent light sources (both organic and inorganic), and electrophosphorescent light sources can also be used. The light intensity of the light sources (such as LEDs 425) is controlled depending on whether the vehicle is being operated in day or night conditions, such as via the sensors described above in connection with display 130. Preferably, a day time intensity of the image display of about 1000 candle power (cd/m2), or greater, could be used, and more preferably about 300 to 400 candle power. In night conditions, a candle power of 1 to 2 cd/m2, or lower, would be preferred, with the most preferred candle power of 1 to 10 cd/m2 being provided.

It is preferred that the letters in the information display 424 be provided in a high contrast ratio against the dark background for the indicia, such as white on black, or the like. Display 424 can be automatically dimmed via sensors as noted above, or pulse-width modulated from an electrical connection to the displays or instruments on the instrument panel in the vehicle. Appropriate circuitry in a circuit board contained within rearview mirror assembly 400 or mirror supports 10, 200 or 300 is provided, such that the intensity of the display could be slaved to the instrument panel or displays, the input frequency controlled and the like. Alternately, display 424 could be connected to a rheostat for manual control of the light intensity of the display. A second information display 430 of the type described below for embodiments 475, 500, 525 and 550 can also be provided in the field of view for reflective element 402 and provide compass heading, temperature, or other vehicle information.

Figure 21:
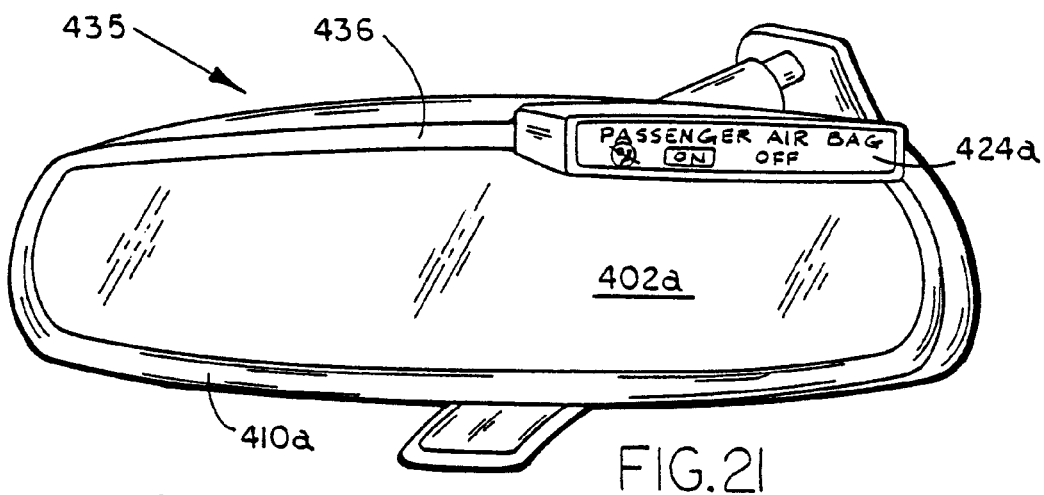
FIG. 21 is a perspective front view of another embodiment of the rearview mirror assembly of the present invention incorporating an information display area in the eyebrow portion of the mirror housing.
Figure 22:
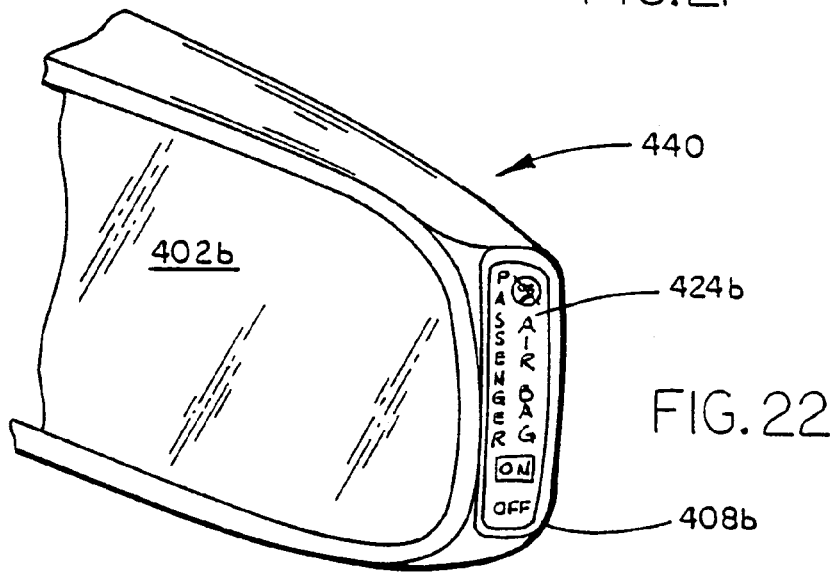
FIG. 22 is a fragmentary perspective view of yet another embodiment of the rearview mirror assembly of the present invention incorporating an information display in an end surface of the mirror assembly.

As also shown in FIGS. 18 and 19, information display 424 can extend and wrap around onto the peripheral side 408 of mirror assembly 400 for better viewing by the passenger seated in the front passenger seat S2. In addition, as shown in FIG. 19, the display can wrap around to the bottom edge 418 of housing portion 414 if desired, as shown by the dotted line. This would enable smaller persons in the passenger seat S2 to look upwardly at the bottom and end surface of the mirror assembly when assembly 400 is canted toward the driver while still enabling the passenger to read and understand the information on the display. In addition, as shown in embodiment 435 in FIG. 21, information display 424a could also be positioned above the reflective mirror element 402a in the "eyebrow" 436 of the front peripheral edge 410a, again canted or angled toward the passenger in seat S2 in a manner similar to housing portion 414. Further, as shown in embodiment 440 in FIG. 22, information display 424b can be positioned in the passenger end 408b of the mirror housing, again preferably angled or canted toward and facing the passenger in seat S2. In the event the rearview mirror assembly is designed for a right-hand drive vehicle, the position of housing portion 414, either in the chin area below element 402 or the eyebrow area above element 402, can be symmetrically reversed such that it is canted toward the left end of the mirror assembly which, with a right-hand drive vehicle, would thus face more toward front passenger seat. Similarly, display 424b can be positioned in the housing end opposite that shown in FIG. 22 for right-hand drive vehicles.

Figure 23:
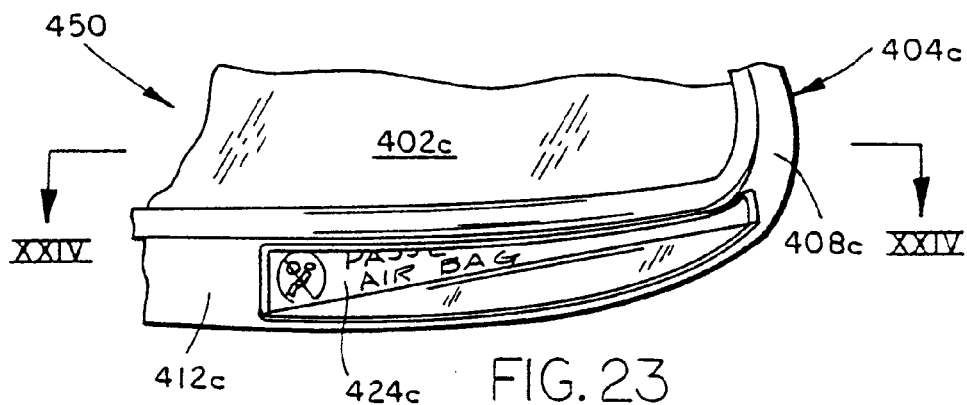
FIG. 23 is a fragmentary front perspective view of a rearview mirror assembly incorporating another embodiment of an information display extending toward the passenger side end of the assembly but recessed within the mirror housing.
Figure 24:
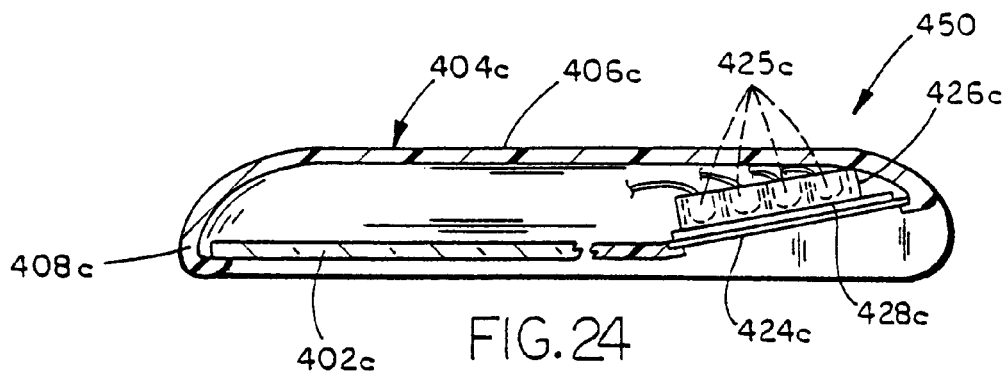
FIG. 24 is a sectional plan view of the rearview mirror assembly taken along plane XXIV-XXIV of FIG. 23.

As shown in FIGS. 23 and 24, an alternate embodiment 450 of the present invention is similar to that shown in FIGS. 18-20, except that information display 424c is recessed at the peripheral edge and in the chin area 412c of mirror housing 404c below the reflective mirror element 402c. Again, just as in embodiment 400, the information display 424c is angled or canted toward the passenger side end of the rearview mirror assembly which, in this case, is on the right-hand side of the vehicle so as to enable better viewing by the passenger in passenger seat S2. As in embodiment 400, display 424c is preferably backlit via LEDs 425c contained in a housing 426c positioned on apertured pad 428c behind the surface of element 424c, all in accord with the lighting assembly described in U.S. Pat. No. 4,882,565 incorporated by reference above.

Figure 25:
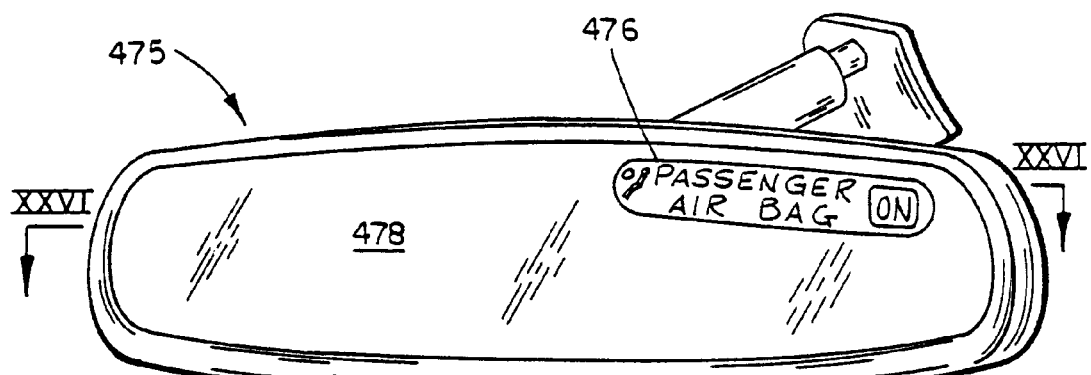
FIG. 25 is a front perspective view of another embodiment of the rearview mirror assembly incorporating an information display in the field of the reflective mirror element.
Figure 26:
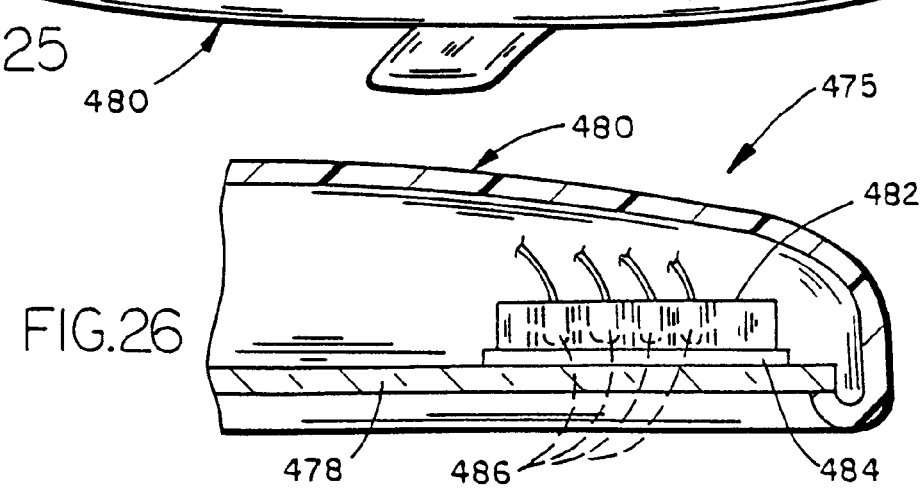
FIG. 26 is a fragmentary, sectional plan view of the rearview mirror assembly taken along plane XXVI-XXVI of FIG. 25.

In the event it is desired to include the PSIR information display in the reflective mirror element itself, embodiment 475 of the rearview mirror assembly can be used as shown in FIGS. 25 and 26. In this version, an information display 476 is provided by forming an elongated, non-reflective coated area on the back of reflective mirror element 478 which is supported within molded rearview mirror housing 480. Alternately, a through-the-cell display in an electro-optic mirror cell can be used, as described in commonly-assigned, U.S. Pat. No. 5,530,240 to Larson et al., the disclosure of which is hereby incorporated by reference herein. Again, display area 476 is preferably dark or opaque with white or light colored letters, in this case providing a PSIR message. As in embodiments 400, 450, the display is preferably backlit with a lighting assembly as described in U.S. Pat. No. 4,882,565 incorporated by reference above, including a housing 482, mounted on apertured pad 484 utilizing a series of light emitting diodes 486 connected electrically to the circuitry within the mirror assembly and then to the electrical system of the vehicle in which the mirror assembly is mounted. In this case, information display 476 is in the upper right-hand corner of reflective mirror element 478 so as to minimize any disruption of the rearward vision of the driver using the mirror assembly.

Figure 27:
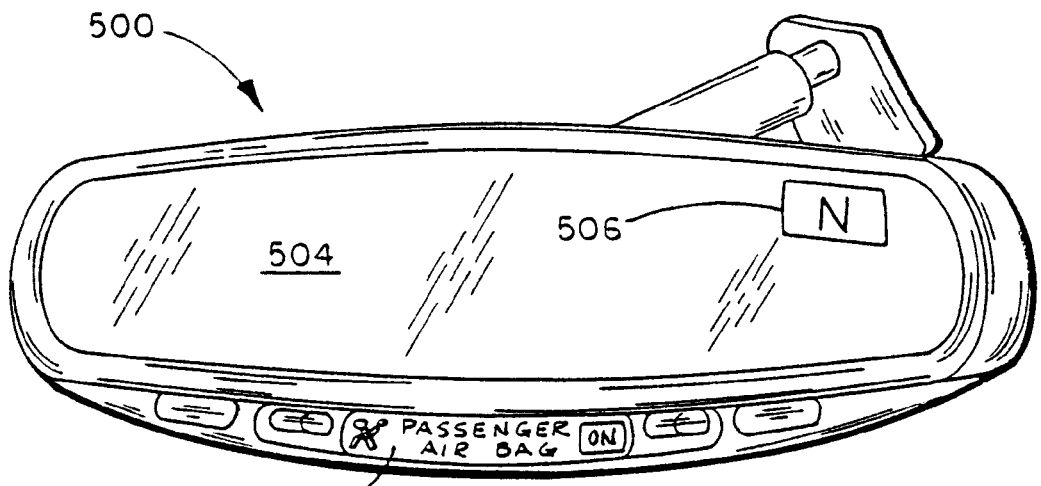
FIG. 27 is a front perspective view of a rearview mirror assembly of the present invention incorporating yet another embodiment of an information display in a portion of the mirror housing below the reflective mirror element along with a separate information display in the field of the reflective mirror element.
Figure 28:
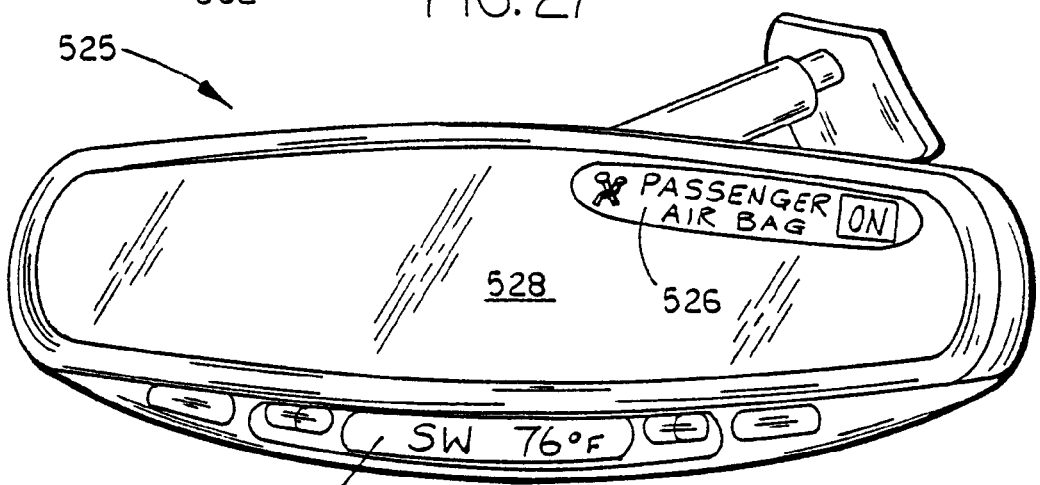
FIG. 28 is a front perspective view of a further embodiment of the rearview mirror assembly of the present invention incorporating information display areas in the mirror housing below the reflective mirror element and within the field of the reflective mirror element.
Figure 29:
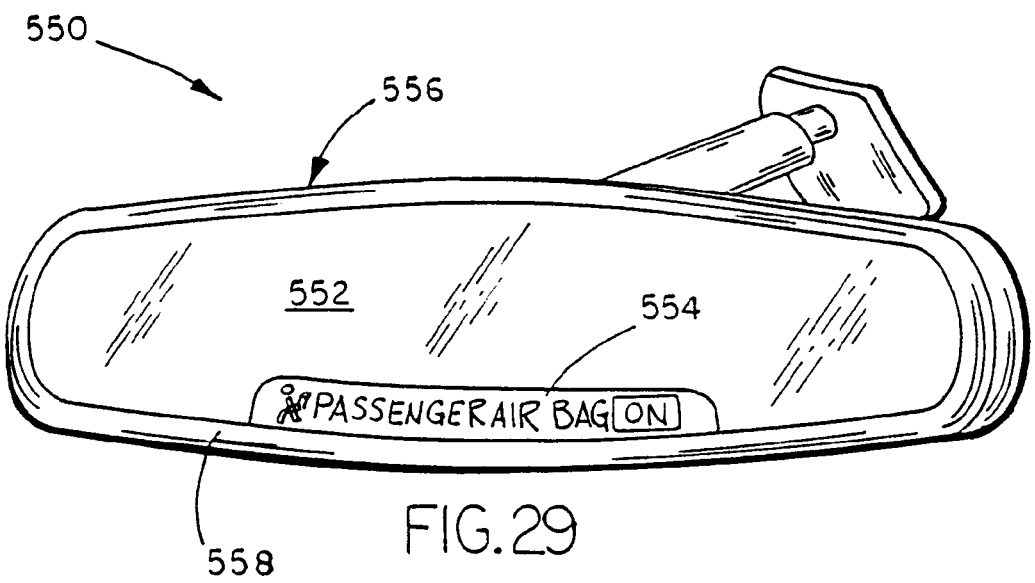
FIG. 29 is a front perspective view of a yet further embodiment of the rearview mirror assembly of the present invention incorporating an information display area in the field of the reflective mirror element immediately above the lower peripheral edge of the mirror housing.

Further embodiments of the present invention are shown in FIGS. 27-29. In FIG. 27, rearview mirror assembly 500 includes a PSIR information display 502 in accord with those described above in embodiments 400, 450 and 475 but positioned in the chin area of the rearview mirror housing below reflective mirror element 504. In addition, a compass read out 506 similar to display 430 or 476 above is provided in the upper right-hand corner of the reflective mirror element such that other vehicle information such as the compass heading, outside temperature, engine status, or the like can be indicated.

In FIG. 28, mirror assembly embodiment 525 includes a PSIR information read out 526 in the upper right-hand corner of reflective mirror element 528 just as in embodiment 475. Also, included is a compass and outside temperature read out information display 530 in the chin area of the housing below the reflective mirror element 528.

In FIG. 29, a PSIR information read out 554 is provided in the lower, central margin of the reflective mirror element 552 adjacent the bottom portion peripheral front edge 558 on mirror housing 556. Again, this position minimizes disruption of the rearview vision of the driver using the mirror.

In each of the embodiments 500, 525, and 550, information displays 502, 506, 526, 530 and 554 are preferably dark areas with light lettering, and backlit using backlighting assemblies as described above and in accord with those described in U.S. Pat. No. 4,882,565 incorporated by reference above. It will also be understood, that each of the rearview mirror embodiments 400, 450, 475, 500, 525 and 550 may be adjustably supported by and used in conjunction with a rearview mirror support and information display such as that described above in conjunction with embodiments 10, 200, or 300, so as to provide multiple information displays visible by the driver and passenger in accord with the invention. It will be understood that, if desired, an information display in support 10, 200, or 300 can be angled or canted toward the passenger or driver at angles such as those described above in FIGS. 16-29, if desired. Also, similar information displays can be provided on separate pods secured to the rearview mirror support on the vehicle windshield as described in commonly-assigned U.S. Pat. No. 5,708,410 to Blank et al., the disclosure of which is hereby incorporated by reference herein, and such information displays can also be angled or canted toward the passenger or driver at angles such as those described above in FIGS. 16-29 for better viewing.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property or privilege is claimed are as follows:

1. An interior mirror system suitable for use in a vehicle, said interior mirror system comprising:
   an interior rearview mirror assembly, said interior rearview mirror assembly comprising a mirror support for attachment to an interior portion of a vehicle to be equipped with said interior rearview mirror assembly;
   wherein said interior rearview mirror assembly comprises a reflective element disposed in a housing, said reflective element comprising a glass substrate having at least a metallic reflector coating established at a surface thereof;
   an information display disposed within said housing and behind said reflective element, wherein said information display comprises a liquid crystal display that is backlit by a plurality of white light emitting diodes;
   wherein information displayed by said information display is viewable through said reflective element by a driver of the equipped vehicle viewing said reflective element of said interior rearview mirror assembly when said interior rearview mirror assembly is normally mounted to an interior portion of the equipped vehicle;
   a photo sensor;
   a control responsive to said photo sensor and operable to distinguish between daytime and nighttime lighting conditions;
   wherein said control is operable to vary the intensity of the information displayed by said information display as viewed through said reflective element by the driver of the equipped vehicle; and
   wherein, when said information display is operating during daytime lighting conditions, said control is operable to adjust the intensity of the displayed information to at least about 1000 cd/m$^2$ as viewed through said reflective element by the driver of the equipped vehicle.

2. The interior mirror system of claim 1 wherein, when said information display is operating during nighttime lighting conditions, said control is operable to reduce the intensity of the displayed information to a reduced level as compared to the intensity of the displayed information during daytime lighting conditions.

3. The interior mirror system of claim 1 wherein said interior rearview mirror assembly comprises a rolling code garage door opener.

4. The interior mirror system of claim 3 wherein said interior rearview mirror assembly comprises a microphone.

5. The interior mirror system of claim 4 wherein said interior rearview mirror assembly comprises a light and wherein said light comprises at least one white light emitting diode.

6. The interior mirror system of claim 5 wherein said interior rearview mirror assembly comprises a console light.

7. The interior mirror system of claim 1 wherein the rearward field of view of said reflective element is pivotally adjustable relative to said mirror support via adjustment of said housing about a pivot element when said interior rearview mirror assembly is attached by said mirror support at an interior portion of the equipped vehicle, and wherein a compass sensor is disposed in said housing and wherein said compass sensor moves with said housing when the rearward field of view of said reflective element is adjusted.

8. The interior mirror system of claim 1 wherein the rearward field of view of said reflective element is pivotally adjustable relative to said mirror support via adjustment of said housing about a pivot element when said interior rearview mirror assembly is attached by said mirror support at an interior portion of the equipped vehicle, and wherein said mirror assembly comprises an imaging sensor, and wherein said imaging sensor comprises one of a CMOS sensor and a CCD sensor, and wherein said imaging sensor is disposed at a portion of said interior rearview mirror assembly that is not adjusted when the driver of the equipped vehicle adjusts the rearward field of view of the reflective element of said interior rearview mirror assembly.

9. The interior mirror system of claim 8 wherein said control at least partially controls a headlight of the equipped vehicle responsive to detection of at least one of an oncoming headlight of another vehicle and a taillight of another vehicle by said imaging sensor.

10. An interior mirror system suitable for use in a vehicle, said interior mirror system comprising:

an interior rearview mirror assembly, said interior rearview mirror assembly comprising a mirror support for attachment to an interior portion of a vehicle to be equipped with said interior rearview mirror assembly;

wherein said interior rearview mirror assembly comprises a reflective element disposed in a housing, said reflective element comprising a glass substrate having a metallic reflector coating established at a surface thereof;

an information display disposed within said housing and behind said reflective element, wherein said information display comprises a liquid crystal display that is backlit by a plurality of white light emitting diodes;

wherein information displayed by said information display is viewable through said reflective element by a driver of the equipped vehicle viewing said reflective element of said interior rearview mirror assembly when said interior rearview mirror assembly is normally mounted to an interior portion of the equipped vehicle;

a photo sensor;

a control responsive to said photo sensor and operable to distinguish between daytime and nighttime lighting conditions;

wherein said control is operable to vary the intensity of the information displayed by said information display as viewed through said reflective element by the driver of the equipped vehicle;

wherein, when said information display is operating during daytime lighting conditions, said control is operable to adjust the intensity of the displayed information to at least about 1000 cd/m$^2$ as viewed through said reflective element by the driver of the equipped vehicle;

wherein, when said information display is operating during nighttime lighting conditions, said control is operable to reduce the intensity of the displayed information to a reduced level as compared to the intensity of the displayed information during daytime lighting conditions; and wherein said interior rearview mirror assembly comprises a rolling code garage door opener.

11. The interior mirror system of claim 10 wherein said interior rearview mirror assembly comprises at least one of a microphone, a light, a console light.

12. The interior mirror system of claim 10 wherein the rearward field of view of said reflective element is pivotally adjustable relative to said mirror support via adjustment of said housing about a pivot element when said interior rearview mirror assembly is attached by said mirror support at an interior portion of the equipped vehicle, and wherein a compass sensor is disposed in said housing and wherein said compass sensor moves with said housing when the rearward field of view of said reflective element is adjusted.

13. The interior mirror system of claim 10 wherein the rearward field of view of said reflective element is pivotally adjustable relative to said mirror support via adjustment of said housing about a pivot element when said interior rearview mirror assembly is attached by said mirror support at an interior portion of the equipped vehicle, and wherein said mirror assembly comprises an imaging sensor, and wherein said imaging sensor comprises one of a CMOS sensor and a CCD sensor, and wherein said imaging sensor is disposed at a portion of said interior rearview mirror assembly that is not adjusted when the driver of the equipped vehicle adjusts the rearward field of view of the reflective element of said interior rearview mirror assembly.

14. The interior mirror system of claim 13 wherein said control at least partially controls a headlight of the equipped vehicle responsive to detection of at least one of an oncoming headlight of another vehicle and a taillight of another vehicle by said imaging sensor.

15. An interior mirror system suitable for use in a vehicle, said interior mirror system comprising:

an interior rearview mirror assembly, said interior rearview mirror assembly comprising a mirror support for attachment to an interior portion of a vehicle to be equipped with said interior rearview mirror assembly;

wherein said interior rearview mirror assembly comprises a reflective element disposed in a housing, said reflective element comprising a glass substrate having at least a metallic reflector coating established at a surface thereof;

an information display disposed within said housing and behind said reflective element, wherein said information display comprises a liquid crystal display that is backlit by a plurality of white light emitting diodes;

wherein information displayed by said information display is viewable through said reflective element by a driver of the equipped vehicle viewing said reflective element of said interior rearview mirror assembly when said interior rearview mirror assembly is normally mounted to an interior portion of the equipped vehicle;

a photo sensor;

a control responsive to said photo sensor and operable to distinguish between daytime and nighttime lighting conditions;

wherein said control is operable to vary the intensity of the information displayed by said information display as viewed through said reflective element by the driver of the equipped vehicle;

wherein, when said information display is operating during daytime lighting conditions, said control is operable to adjust the intensity of the displayed information to at least about 1000 cd/m$^2$ as viewed through said reflective element by the driver of the equipped vehicle;

wherein, when said information display is operating during nighttime lighting conditions, said control is operable to reduce the intensity of the displayed information to a reduced level as compared to the intensity of the displayed information during daytime lighting conditions; and wherein said interior rearview mirror assembly comprises at least one of (i) a rolling code garage door opener, (ii) a microphone, (iii) a light and wherein said light comprises at least one white light emitting diode, (iv) a console light, and (v) a compass sensor that is disposed in said housing and that moves with said housing when the driver adjusts said housing to adjust a rearward field of view of said reflective element.

16. The interior mirror system of claim 15, wherein the rearward field of view of said reflective element is pivotally adjustable relative to said mirror support via adjustment of said housing about a pivot element when said interior rearview mirror assembly is attached by said mirror support at an interior portion of the equipped vehicle, and wherein said mirror assembly comprises an imaging sensor, and wherein said imaging sensor comprises one of a CMOS sensor and a CCD sensor, and wherein said imaging sensor is disposed at a portion of said interior rearview mirror assembly that is not adjusted when the driver of the equipped vehicle adjusts the rearward field of view of the reflective element of said interior rearview mirror assembly.

17. The interior mirror system of claim 16 wherein said control at least partially controls a headlight of the equipped vehicle responsive to detection of at least one of an oncoming headlight of another vehicle and a taillight of another vehicle by said imaging sensor.

18. The interior mirror system of claim 15 wherein said interior rearview mirror assembly comprises a rolling code garage door opener.

19. The interior mirror system of claim 18 wherein said interior rearview mirror assembly comprises a microphone.

20. The interior mirror system of claim 19 wherein said interior rearview mirror assembly comprises a light and wherein said light comprises at least one white light emitting diode.

* * * * *

UNITED STATES PATENT AND TRADEMARK OFFICE
CERTIFICATE OF CORRECTION

PATENT NO. : 7,667,579 B2  Page 1 of 1
APPLICATION NO. : 12/339775
DATED : February 23, 2010
INVENTOR(S) : Jonathan E. DeLine and Niall R. Lynam It is certified that error appears in the above-identified patent and that said Letters Patent is hereby corrected as shown below:

Column 2:
Line 4, "minor" should be --mirror--.

Column 19:
Line 32, "WAGING" should be --IMAGING--.

Column 26:
Line 23, "minor" should be --mirror--.
Line 23, "," should be --.-- after "display".

Column 27:
Line 8, Delete "," after "components".
Line 63, "PSR" should be --PSIR--.

Column 32:
Line 37, Claim 1, Insert --light-- after "light".

Column 33:
Line 3, Claim 5, Insert --light-- after "light" in the second occurrence.
Line 46, Claim 10, Insert --light-- after "light".

Column 34:
Line 51, Claim 15, Insert --light-- after "light".

Column 35:
Line 13, Claim 15, Insert --light-- after "light" in the second occurrence.

Column 36:
Line 20, Claim 20, Insert --light-- after "light".

Signed and Sealed this

Twenty-ninth Day of June, 2010

David J. Kappos
*Director of the United States Patent and Trademark Office*